US009959333B2

(12) United States Patent
Kumarasamy et al.

(10) Patent No.: US 9,959,333 B2
(45) Date of Patent: *May 1, 2018

(54) UNIFIED ACCESS TO PERSONAL DATA

(71) Applicant: Commvault Systems, Inc., Tinton Falls, NJ (US)

(72) Inventors: Paramasivam Kumarasamy, Morganville, NJ (US); Anand Vibhor, Manalapan, NJ (US); Jun H. Ahn, Manalapan, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/012,276

(22) Filed: Feb. 1, 2016

(65) Prior Publication Data
US 2016/0224651 A1 Aug. 4, 2016

Related U.S. Application Data

(63) Continuation of application No. 13/788,886, filed on Mar. 7, 2013, now Pat. No. 9,262,496.
(Continued)

(51) Int. Cl.
*G06F 17/30* (2006.01)

(52) U.S. Cl.
CPC .. *G06F 17/30575* (2013.01); *G06F 17/30082* (2013.01); *G06F 17/30581* (2013.01)

(58) Field of Classification Search
CPC ............ G06F 17/212; G06F 17/30011; G06F 17/30867; G06F 17/30994; G06F 17/30082; G06F 17/30575
See application file for complete search history.

(56) References Cited

U.S. PATENT DOCUMENTS 4,686,620 A 8/1987 Ng
4,995,035 A 2/1991 Cole et al.
(Continued)

FOREIGN PATENT DOCUMENTS

CN 1259733 A 7/2000
CN 1525272 A 9/2004
(Continued)

OTHER PUBLICATIONS

"Amazon Web Services@Amazon.com." http://web.archive.org/web/20080819144354/http://aws.amazon.com/s3, Aug. 19, 2008.
(Continued)

*Primary Examiner* — Debbie Le
(74) *Attorney, Agent, or Firm* — Perkins Cole LLP

(57) ABSTRACT

A method and system for providing unified access to data for multiple computing devices includes a system that associates multiple computing devices with a user of an information management system, assigns information management policies to data from the multiple computing devices within the information management system, and collects multiple data objects from the multiple computers. The system may generate a preview version of each collected data object, and provide at least one preview version of a collected data object to a computing device associated with the user. The system may also generate indexing information for each collected data object and distribute the indexing information with the preview version of the data object.

16 Claims, 16 Drawing Sheets

Related U.S. Application Data

(60) Provisional application No. 61/618,566, filed on Mar. 30, 2012.

(56) References Cited

U.S. PATENT DOCUMENTS

| | | |
|---|---|---|
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,619,644 A | 4/1997 | Crockett et al. |
| 5,638,509 A | 6/1997 | Dunphy et al. |
| 5,664,204 A | 9/1997 | Wang |
| 5,673,381 A | 9/1997 | Huai et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,327,590 B1 | 12/2001 | Chidlovskii et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,421,711 B1 | 7/2002 | Blumenau et al. |
| 6,487,561 B1 | 11/2002 | Ofek et al. |
| 6,519,679 B2 | 2/2003 | Devireddy et al. |
| 6,538,669 B1 | 3/2003 | Lagueux, Jr. et al. |
| 6,564,228 B1 | 5/2003 | O'Connor |
| 6,658,526 B2 | 12/2003 | Nguyen et al. |
| 6,941,429 B1 | 9/2005 | Kamvysselis et al. |
| 6,973,555 B2 | 12/2005 | Fujiwara et al. |
| 7,035,880 B1 | 4/2006 | Crescenti et al. |
| 7,079,341 B2 | 7/2006 | Kistler et al. |
| 7,107,298 B2 | 9/2006 | Prahlad et al. |
| 7,130,272 B1 | 10/2006 | Gai et al. |
| 7,225,220 B2 | 5/2007 | Gonzalez et al. |
| 7,246,207 B2 | 7/2007 | Kottomtharayil et al. |
| 7,260,633 B2 | 8/2007 | Lette et al. |
| 7,340,616 B2 | 3/2008 | Rothman et al. |
| 7,343,356 B2 | 3/2008 | Prahlad et al. |
| 7,343,453 B2 | 3/2008 | Prahlad et al. |
| 7,346,751 B2 | 3/2008 | Prahlad et al. |
| 7,366,846 B2 | 4/2008 | Boyd et al. |
| 7,386,744 B2 | 6/2008 | Barr et al. |
| 7,395,282 B1 | 7/2008 | Crescenti et al. |
| 7,448,079 B2 | 11/2008 | Tremain |
| 7,472,079 B2 | 12/2008 | Fellenstein et al. |
| 7,502,820 B2 | 3/2009 | Manders et al. |
| 7,516,346 B2 | 4/2009 | Pinheiro et al. |
| 7,526,798 B2 | 4/2009 | Chao et al. |
| 7,546,475 B2 | 6/2009 | Mayo et al. |
| 7,587,570 B2 | 9/2009 | Sarkar et al. |
| 7,617,191 B2 | 11/2009 | Wilbrink et al. |
| 7,627,827 B2 | 12/2009 | Taylor et al. |
| 7,631,351 B2 | 12/2009 | Erofeev |
| 7,651,593 B2 | 1/2010 | Prahlad et al. |
| 7,668,884 B2 | 2/2010 | Prahlad et al. |
| 7,685,269 B1 | 3/2010 | Thrasher et al. |
| 7,694,070 B2 | 4/2010 | Mogi et al. |
| 7,739,548 B2 | 6/2010 | Goodrum et al. |
| 7,761,736 B2 | 7/2010 | Nguyen et al. |
| 7,765,167 B2 | 7/2010 | Prahlad et al. |
| 7,769,616 B2 | 8/2010 | Ollivier |
| 7,778,984 B2 | 8/2010 | Zhang et al. |
| 7,792,789 B2 | 9/2010 | Prahlad et al. |
| 7,797,453 B2 | 9/2010 | Meijer et al. |
| 7,814,149 B1 | 10/2010 | Stringham |
| 7,814,351 B2 | 10/2010 | Lubbers et al. |
| 7,818,082 B2 | 10/2010 | Roumeliotis et al. |
| 7,822,967 B2 | 10/2010 | Fung |
| 7,840,537 B2 | 11/2010 | Gokhale et al. |
| 7,882,077 B2 | 2/2011 | Gokhale et al. |
| 7,899,788 B2 | 3/2011 | Chandhok et al. |
| 7,917,438 B2 | 3/2011 | Kenedy et al. |
| 7,996,270 B2 | 8/2011 | Sundaresan |
| 8,001,277 B2 | 8/2011 | Mega et al. |
| 8,037,028 B2 | 10/2011 | Prahlad et al. |
| 8,065,166 B2 | 11/2011 | Maresh et al. |
| 8,108,427 B2 | 1/2012 | Prahlad et al. |
| 8,112,605 B2 | 2/2012 | Kavuri |
| 8,134,727 B1 | 3/2012 | Shmunis et al. |
| 8,140,786 B2 | 3/2012 | Bunte et al. |
| 8,219,524 B2 | 7/2012 | Gokhale |
| 8,266,406 B2 | 9/2012 | Kavuri |
| 8,285,681 B2 | 10/2012 | Prahlad et al. |
| 8,296,534 B1 | 10/2012 | Gupta et al. |
| 8,307,177 B2 | 11/2012 | Prahlad et al. |
| 8,316,091 B2 | 11/2012 | Hirvela et al. |
| 8,321,688 B2 | 11/2012 | Auradkar et al. |
| 8,352,608 B1 | 1/2013 | Keagy et al. |
| 8,364,802 B1 | 1/2013 | Keagy et al. |
| 8,370,307 B2 | 2/2013 | Wolfe |
| 8,396,838 B2 | 3/2013 | Brockway et al. |
| 8,407,190 B2 | 3/2013 | Prahlad et al. |
| 8,417,697 B2 | 4/2013 | Ghemawat et al. |
| 8,429,630 B2 | 4/2013 | Nickolov et al. |
| 8,434,131 B2 | 4/2013 | Varadharajan et al. |
| 8,510,573 B2 | 8/2013 | Muller et al. |
| 8,527,549 B2 | 9/2013 | Cidon |
| 8,566,362 B2 | 10/2013 | Mason, Jr. et al. |
| 8,578,120 B2 | 11/2013 | Attarde et al. |
| 8,612,439 B2 | 12/2013 | Prahlad et al. |
| 8,626,741 B2 | 1/2014 | Vijayakumar et al. |
| 8,635,184 B2 | 1/2014 | Hsu et al. |

(56) References Cited

U.S. PATENT DOCUMENTS

| | | |
|---|---|---|
| 8,660,038 B1 | 2/2014 | Pascazio et al. |
| 8,674,823 B1 | 3/2014 | Contario et al. |
| 8,683,103 B2 | 3/2014 | Ripberger |
| 8,707,070 B2 | 4/2014 | Muller |
| 8,769,048 B2 | 7/2014 | Kottomtharayil |
| 8,780,400 B2 | 7/2014 | Shmunis et al. |
| 8,799,242 B2 | 8/2014 | Leonard et al. |
| 8,849,761 B2 | 9/2014 | Prahlad et al. |
| 8,849,955 B2 | 9/2014 | Prahlad et al. |
| 8,924,511 B2 | 12/2014 | Brand |
| 8,950,009 B2 | 2/2015 | Vijayan et al. |
| 9,021,282 B2 | 4/2015 | Muller |
| 9,021,307 B1 | 4/2015 | Parameswaran et al. |
| 9,195,636 B2* | 11/2015 | Smith .................. G06F 17/212 |
| 2002/0035511 A1 | 3/2002 | Haji et al. |
| 2002/0083079 A1 | 6/2002 | Meier et al. |
| 2002/0095609 A1 | 7/2002 | Tokunaga |
| 2002/0129106 A1 | 9/2002 | Gutfreund |
| 2002/0194033 A1 | 12/2002 | Huff |
| 2002/0194511 A1 | 12/2002 | Swoboda |
| 2003/0140068 A1 | 7/2003 | Yeung |
| 2003/0200222 A1 | 10/2003 | Feinberg et al. |
| 2004/0210724 A1 | 10/2004 | Koning et al. |
| 2006/0058994 A1 | 3/2006 | Ravi et al. |
| 2006/0190775 A1 | 8/2006 | Aggarwal et al. |
| 2006/0206507 A1 | 9/2006 | Dahbour |
| 2006/0224846 A1 | 10/2006 | Amarendran et al. |
| 2006/0242356 A1 | 10/2006 | Mogi et al. |
| 2006/0245411 A1 | 11/2006 | Chen et al. |
| 2007/0101173 A1 | 5/2007 | Fung |
| 2008/0005168 A1 | 1/2008 | Huff et al. |
| 2008/0183891 A1 | 7/2008 | Ni et al. |
| 2008/0228771 A1 | 9/2008 | Prahlad et al. |
| 2008/0244032 A1 | 10/2008 | Gilson et al. |
| 2008/0256384 A1 | 10/2008 | Branson et al. |
| 2009/0198677 A1 | 8/2009 | Sheehy et al. |
| 2009/0210464 A1 | 8/2009 | Chiang-Lin |
| 2009/0268903 A1 | 10/2009 | Bojinov et al. |
| 2009/0287665 A1 | 11/2009 | Prahlad et al. |
| 2009/0319534 A1 | 12/2009 | Gokhale |
| 2010/0064033 A1 | 3/2010 | Travostino et al. |
| 2010/0070448 A1 | 3/2010 | Omoigui |
| 2010/0070466 A1 | 3/2010 | Prahlad et al. |
| 2010/0070474 A1 | 3/2010 | Lad |
| 2010/0082672 A1 | 4/2010 | Kottomtharayil et al. |
| 2010/0082700 A1 | 4/2010 | Parab |
| 2010/0082713 A1 | 4/2010 | Frid-Nielsen et al. |
| 2010/0162002 A1 | 6/2010 | Dodgson et al. |
| 2010/0190478 A1* | 7/2010 | Brewer .................. H04W 4/10 455/414.1 |
| 2010/0257403 A1 | 10/2010 | Virk et al. |
| 2010/0269164 A1 | 10/2010 | Sosnosky et al. |
| 2010/0274772 A1 | 10/2010 | Samuels |
| 2010/0318782 A1 | 12/2010 | Auradkar et al. |
| 2010/0332401 A1 | 12/2010 | Prahlad et al. |
| 2010/0333116 A1 | 12/2010 | Prahlad et al. |
| 2011/0022642 A1 | 1/2011 | deMilo et al. |
| 2011/0040824 A1 | 2/2011 | Harm |
| 2011/0191544 A1 | 8/2011 | Naga et al. |
| 2011/0277027 A1 | 11/2011 | Hayton et al. |
| 2012/0054626 A1 | 3/2012 | Odenheimer |
| 2012/0110186 A1 | 5/2012 | Kapur et al. |
| 2012/0131645 A1 | 5/2012 | Harm |
| 2012/0240183 A1 | 9/2012 | Sinha |
| 2013/0007245 A1 | 1/2013 | Malik et al. |
| 2013/0035795 A1 | 2/2013 | Pfeiffer et al. |
| 2013/0125198 A1 | 5/2013 | Ferguson et al. |
| 2013/0238572 A1 | 9/2013 | Prahlad et al. |
| 2013/0238969 A1* | 9/2013 | Smith .................. G06F 17/212 715/230 |
| 2013/0262385 A1 | 10/2013 | Kumarasamy et al. |
| 2013/0297902 A1 | 11/2013 | Collins et al. |
| 2013/0326279 A1 | 12/2013 | Chavda et al. |
| 2014/0189432 A1 | 7/2014 | Gokhale et al. |
| 2014/0283010 A1 | 9/2014 | Rutkowski et al. |
| 2015/0012495 A1 | 1/2015 | Prahlad et al. |
| 2015/0113055 A1 | 4/2015 | Vijayan et al. |
| 2015/0127967 A1 | 5/2015 | Dutton et al. |
| 2015/0198995 A1 | 7/2015 | Muller |
| 2016/0100013 A1 | 4/2016 | Vijayan et al. |

FOREIGN PATENT DOCUMENTS

| | | |
|---|---|---|
| CN | 1936818 | 3/2007 |
| CN | 1968254 | 5/2007 |
| EP | 0259912 A1 | 3/1988 |
| EP | 0405926 A2 | 1/1991 |
| EP | 0467546 A2 | 1/1992 |
| EP | 0774715 A1 | 5/1997 |
| EP | 0809184 A1 | 11/1997 |
| EP | 0817040 A2 | 1/1998 |
| EP | 0899662 A1 | 3/1999 |
| EP | 0981090 A1 | 2/2000 |
| WO | WO-9513580 A1 | 5/1995 |
| WO | WO-9912098 A1 | 3/1999 |

OTHER PUBLICATIONS

Armstead et al., "Implementation of a Campwide Distributed Mass Storage Service: The Dream vs. Reality," IEEE, Sep. 11-14, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Bates, S. et al., "Sharepoint 2007 User's Guide," pp. 1-88, 2007, Springer-Verlag New York, Inc., 104 pages.

Brandon, J., "Virtualization Shakes Up Backup Strategy," <http://www.computerworld.com>, internet accessed on Mar. 6, 2008, 3 pages.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Chiappetta, Marco, "ESA Enthusiast System Architecture," <http://hothardware.com/Articles/NVIDIA_ESA_Enthusiast_System_Architecture/>, Nov. 5, 2007, 2 pages.

CommVault Systems, Inc., "A CommVault White Paper: VMware Consolidated Backup (VCB) Certification Information Kit," 2007, 23 pages.

CommVault Systems, Inc., "CommVault Solutions—VMware," <http://www.commvault.com/solutions/vmware/>, internet accessed Mar. 24, 2008, 2 pages.

CommVault Systems, Inc., "Enhanced Protection and Manageability of Virtual Servers," Partner Solution Brief, 2008, 6 pages.

Davis, D., "3 VMware Consolidated Backup (VCB) Utilities You Should Know," Petri IT Knowlegebase, <http://www.petri.co.il/vmware-consolidated-backup-utilities.htm>, internet accessed on Jul. 14, 2008, Jan. 7, 2008.

Davis, D., "Understanding VMware VMX Configuration Files," Petri IT Knowledgebase, <http://www.petri.co.il/virtual_vmware_vmx_configuration_files.htm>, internet accessed on Jun. 19, 2008, 6 pages.

Davis, D., "VMware Server & Workstation Disk Files Explained," Petri IT Knowledgebase, <http://www.petri.co.il/virtual_vmware_files_explained.htm>, internet accessed on Jun. 19, 2008, 5 pages.

Davis, D., "VMware Versions Compared," Petri IT Knowledgebase, <http://www.petri.co.il/virtual_vmware_versions_compared.htm>, internet accessed on Apr. 28, 2008, 6 pages.

Eitel, "Backup and Storage Management in Distributed Heterogeneous Environments," IEEE, Jun. 12-16, 1994, pp. 124-126.

Foster, et al., "Cloud Computing and Grid Computing 360-Degree Comparied," Grid Computing Environments Workshop, 2008.

Gait, J., "The Optical File Cabinet: A Random-Access File System for Write-Once Optical Disks," *IEEE Computer*, vol. 21, No. 6, pp. 11-22 (Jun. 1988).

(56) References Cited

OTHER PUBLICATIONS

International Search Report and Written Opinion for International Application No. PCT/US08/74686, dated Jun. 22, 2009, 13 pages.
International Search Report and Written Opinion for International Application No. PCT/US2010/040402, dated Feb. 24, 2011, 11 pages.
International Search Report and Written Opinion for PCT/US2011/054374, dated May 2, 2012, 9 pages.
Jander, M., "Launching Storage-Area Net," *Data Communications*, US, McGraw Hill, NY, vol. 27, No. 4 (Mar. 21, 1998), pp. 64-72.
Liu et al., "Semantic data de-duplication for archival storage system", IEEE 2008, 9 pages.
Mell et al., "The NIST Definition of Cloud Computing," NIST Special Publication, 2011.
Microsoft Corporation, "How NTFS Works," Windows Server TechCenter, updated Mar. 28, 2003, internet accessed Mar. 26, 2008, 26 pages.
Parlante, Nick; Linked List Basics; 2001, pp. 1-26.
Rosenblum et al., "The Design and Implementation of a Log-Structured File System," *Operating Systems Review SIGOPS*, vol. 25, No. 5, New York, US, pp. 1-15 (May 1991).
Sanbarrow.com, "Disktype-table," <http://sanbarrow.com/vmdk/disktypes.html>, internet accessed on Jul. 22, 2008, 4 pages.
Sanbarrow.com, "Files Used by a VM," <http://sanbarrow.com/vmx/vmx-files-used-by-a-vm.html>, internet accessed on Jul. 22, 2008, 2 pages.
Sanbarrow.com, "Monolithic Versus Split Disks," <http://sanbarrow.com/vmdk/monolithicversusspllit.html>, internet accessed on Jul. 14, 2008, 2 pages.
Second Office Action in Chinese Application No. 201210585073.2, dated Nov. 18, 2015, 17 pages, with English.
VMware, Inc., "Open Virtual Machine Format," <http://www.vmware.com/appliances/learn/ovf.html>, internet accessed on May 6, 2008, 2 pages.
VMware, Inc., "OVF, Open Virtual Machine Format Specification, version 0.9," White Paper, <http://www.vmware.com>, 2007, 50 pages.
VMware, Inc., "The Open Virtual Machine Format Whitepaper for OVF Specification, version 0.9," . White Paper, <http://www.vmware.com>, 2007, 16 pages.
VMware, Inc., "Understanding VMware Consolidated Backup," White Paper, <http://www.vmware.com>, 2007, 11 pages.
VMware, Inc., "Using VMware Infrastructure for Backup and Restore," Best Practices, <http://www.vmware.com>, 2006, 20 pages.
VMware, Inc., "Virtual Disk API Programming Guide," <http://www.vmware.com>, Revision 20080411, 2008, 44 pages.
VMware, Inc., "Virtual Disk Format 1.1," VMware Technical Note, <http://www.vmware.com>, Revision 20071113, Version 1.1, 2007, 18 pages.
VMware, Inc., "Virtual Machine Backup Guide, ESX Server 3.0.1 and VirtualCenter 2.0.1," <http://www.vmware.com>, updated Nov. 21, 2007, 74 pages.
VMware, Inc., "Virtual Machine Backup Guide, ESX Server 3.5, ESX Server 3i version 3.5, VirtualCenter 2.5," <http://www.vmware.com>, updated Feb. 21, 2008, 78 pages.
VMware, Inc., "Virtualized iSCSI SANS: Flexible, Scalable Enterprise Storage for Virtual Infrastructures," White Paper, <http://www.vmware.com>, Mar. 2008, 13 pages.
VMware, Inc., "VMware Consolidated Backup, Improvements in Version 3.5," Information Guide, <http://www.vmware.com>, 2007, 11 pages.
VMware, Inc., "VMware Consolidated Backup," Product Datasheet, <http://www.vmware.com>, 2007, 2 pages.
VMware, Inc., "VMware ESX 3.5," Product Datasheet, <http://www.vmware.com>, 2008, 4 pages.
VMware, Inc., "VMware GSX Server 3.2, Disk Types: Virtual and Physical," <http://www.vmware.com/support/gsx3/doc/disks_types_gsx.html>, internet accessed on Mar. 25, 2008, 2 pages.
VMware, Inc., "VMware OVF Tool," Technical Note, <http://www.vmware.com>, 2007, 4 pages.
VMware, Inc., "VMware Workstation 5.0, Snapshots in a Linear Process," <http:/www.vmware.com/support/ws5/doc/ws_preserve_sshot_linear.html>, internet accessed on Mar. 25, 2008, 1 page.
VMware, Inc., "VMware Workstation 5.0, Snapshots in a Process Tree," <http://www.vmware.com/support/ws5/doc/ws_preserve_sshot_tree.html>, internet accessed on Mar. 25, 2008, 1 page.
VMware, Inc., "VMware Workstation 5.5, What Files Make Up a Virtual Machine?" <http://www.vmware.com/support/ws55/doc/ws_learning_files_in_a_vm.html>, internet accessed on Mar. 25, 2008, 2 pages.
Wang et al. "Performance analysis of data deduplication technology for storage", Proc. of SPIE vol. 7517, 2007, 7 pages.
Wikipedia, "Cloud computing," <http://en.wikipedia.org/wiki/Cloud_computing>, internet accessed Jul. 8, 2009, 13 pages.
Wikipedia, "Cluster (file system)," <http://en.wikipedia.org/wiki/Cluster_%28file_system%29>, internet accessed Jul. 25, 2008, 1 page.
Wikipedia, "Cylinder-head-sector," <http://en.wikipedia.org/wiki/Cylinder-head-sector>, internet accessed Jul. 22, 2008, 6 pages.
Wikipedia, "File Allocation Table," <http://en.wikipedia.org/wiki/File_Allocation_Table>, internet accessed on Jul. 25, 2008, 19 pages.
Wikipedia, "Logical Disk Manager," <http://en.wikipedia.org/wiki/Logical_Disk_Manager>, internet accessed Mar. 26, 2008, 3 pages.
Wikipedia, "Logical Volume Management," <http://en.wikipedia.org/wiki/Logical_volume_management>, internet accessed on Mar. 26, 2008, 5 pages.
Wikipedia, "Storage Area Network," <http://en.wikipedia.org/wiki/Storage_area_network>, internet accessed on Oct. 24, 2008, 5 pages.
Wikipedia, "Virtualization," <http://en.wikipedia.org/wiki/Virtualization>, internet accessed Mar. 18, 2008, 7 pages.

* cited by examiner

| Obj. ID | Ver. ID | Hash | User ID | Obj. LU | Source | Obj. Name | Analysis Data | Time Stamp | Preview |
|---|---|---|---|---|---|---|---|---|---|
| 1030 — 123456 | 1 | ad8f9ad87f | jane65 | ptr1* | Facebook Jane/ European Album | Image1.jpg | CI_1* | Mar-8-12-3:01pm | pr123456* |
| 1035 — 234567 | 1 | adfga3240 | jane65 | ptr2* | Facebook Jane/ European Album | Image2.jpg | CI_2* | Mar-8-12-3:02pm | pr234567* |
| 1040 — 345678 | 8 | 09a0d9fa2 | jane65 | ptr3* | Janes_Laptop/this/is/a/path | Doc2.doc | CI_3* | Mar-9-12-8:01pm | pr345678* |

*FIG. 10*

| User ID | Destination Device/Portal | Destination Directory | Obj ID | Ver. ID | Index Sent | Preview Sent | Copy Sent | Copy Locked |
|---|---|---|---|---|---|---|---|---|
| 1101 — jane65 | Janes_Laptop | /Facebook Jane/pics/ European Album | 123456 | 1 | Mar-8-12-3:03pm | Mar-8-12-3:03pm | Mar-8-12-3:05pm | Mar-8-12-3:05pm |
| 1103 — jane65 | Janes Tablet | /Facebook Jane/pics/ European Album | 123456 | 1 | Mar-11-12-1:01am | --- | --- | --- |
| 1105 — jane65 | Jane65 Portal | /Facebook Jane/pics/ European Album | 123456 | 1 | Mar-8-12-3:03pm | Mar-8-12-3:03pm | --- | --- |
| jane65 | Janes Tablet | /Facebook Jane/pics/ European Album | 234567 | 1 | Mar-11-12-1:01am | --- | --- | --- |

*FIG. 11*

UNIFIED ACCESS TO PERSONAL DATA

CROSS-REFERENCE TO RELATED APPLICATIONS

The present application is a continuation of U.S. patent application Ser. No. 13/788,886, filed Mar. 7, 2013, now U.S. Pat. No. 9,262,496, which claims priority to and the benefit of U.S. Provisional Application No. 61/618,566, filed Mar. 30, 2012, each of which is hereby incorporated herein by reference in its entirety.

BACKGROUND

Increasingly, people generate data and metadata across multiple computing devices and multiple hosted services. For example, during the course of a single day, a person may use a laptop computer, desktop computer, tablet computer, and smartphone in order to view and edit files, e-mails, or other data objects. As another example, a person may use hosted solutions such as Facebook, Gmail, Google Docs, and salesforce.com to communicate with others and conduct work. A person may not be able to access the files and information they need readily from a single interface, since the files are scattered across multiple computing devices and hosted sites. Moreover, conventional information management systems are often focused on organizing, protecting, and recovering the data from fixed computing devices, such as servers or desktop computers. As a result, a person's hosted data and mobile data may be scattered outside of the purview of conventional information management systems and that data will therefore not be backed up or otherwise actively managed. Thus, in the event that a mobile device is lost or broken or a hosted service has a service disruption, there is a risk that a person's critical data may be lost, without any way to recover it.

The need exists for systems and methods that overcome the above problems, as well as systems and methods that provide additional benefits. Overall, the examples herein of some prior or related systems and methods and their associated limitations are intended to be illustrative and not exclusive. Other limitations of existing or prior systems and methods will become apparent to those of skill in the art upon reading the following detailed description.

BRIEF DESCRIPTION OF THE DRAWINGS

FIG. 10 shows an example of an object log index.

FIG. 11 shows an example of a distribution index.

DETAILED DESCRIPTION

Figure 1:
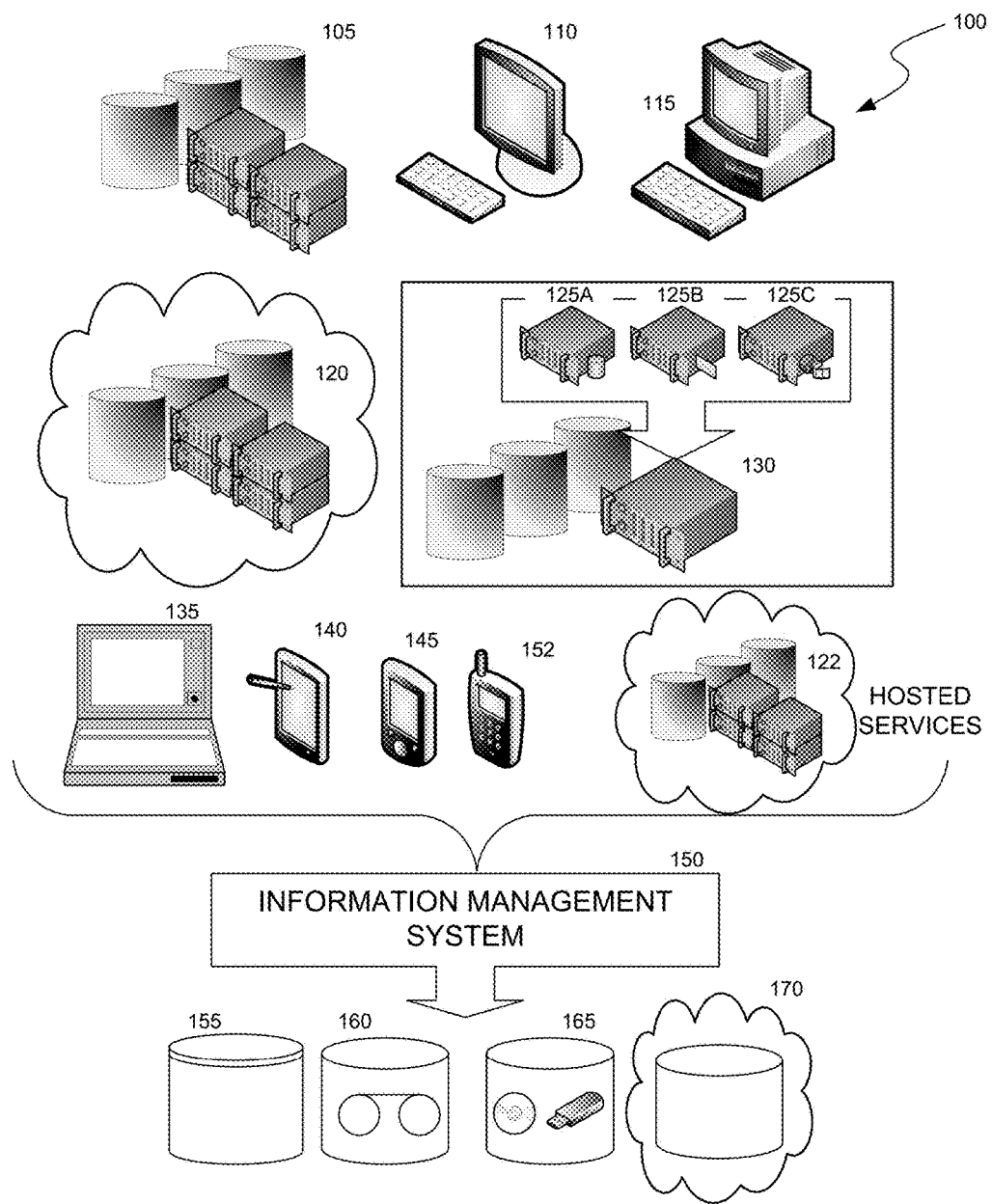
FIG. 1 is a block diagram illustrating an example of a suitable information management environment in which aspects of the inventive systems and methods may operate.

The headings provided herein are for convenience only and do not necessarily affect the scope or meaning of the disclosure.

Overview

A software, firmware, and/or hardware system for comprehensive information management is disclosed. The system helps collect, manage and distribute, in a unified fashion, data and metadata from numerous sources, including data and metadata originating from hosted services and mobile devices. The system can help a user obtain a unified view of her data across numerous devices and also keep data synchronized across numerous computing devices associated with the user. The system permits users to define simple or complex data distribution policies to help drive data distribution and synchronization across the user's devices. The system allows a user on a mobile device to perform "live browsing" of the files on another computing device that is associated with the user. The system also permits a user of a mobile device or other limited-feature device to execute full-featured applications installed on a remote computing device (e.g., a desktop or laptop device) and to interact with the full-featured application via the input-output hardware of the limited-feature device.

The system offers numerous benefits. First, from a single interface, users can browse and search for files from practically any of their computing devices or hosted services and access those files. Second, the system provides a closed corporate collaboration environment where data objects are exchanged and synchronized across multiple devices, but using the resources of a private information management system, not an untrusted or untried third-party service. As a result, copies of an organization's data objects are not unnecessarily exposed to others because the copies do not need to be stored or controlled by third parties. Third, the system permits an organization to better comply with data retention regulations and other regulations by capturing and managing practically all of a user's data, not just the user's data that originates from fixed computing devices. Fourth, the system can permit an organization to better respond to unexpected data losses, such as the loss of a mobile device or a service outage by a hosted service, because the system is actively managing copies of mobile data and hosted data. Other benefits are of course possible.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention may include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Information Management Environment

Aspects of the technologies described herein may be practiced in an information management environment 100, which will now be described while referencing FIG. 1. As shown in FIG. 1, the environment 100 includes multiple computing devices that execute numerous software applications to facilitate the operations of an organization (or multiple affiliated organizations), such as a household, corporation or other business entity, a non-profit organization, an educational institution, or a governmental agency. The computing devices may include one or more: servers 105 (such as mail servers, file servers, database servers, print servers, and web servers), personal computers 110, workstations 115, or other types of fixed computing systems such as mainframe computers and minicomputers (not shown). The servers 105 may include network-attached storage (NAS) filers.

The environment 100 may include virtualized computing resources, such as a virtual machine 120 provided to the organization by a third-party cloud service vendor or a virtual machine 125 running on a virtual machine host 130 operated by the organization. For example, the organization may use one virtual machine 125A as a database server and another virtual machine 125B as a mail server. The environment 100 may also include mobile or portable computing devices, such as laptops 135, tablet computers 140, personal data assistants 145, mobile phones 152 (such as smartphones), and other mobile or portable computing devices such as embedded computers, set top boxes, vehicle-mounted devices, wearable computers, etc.

Of course, other types of computing devices may form part of the environment 100. As part of their function, each of these computing devices creates, accesses, modifies, writes, and otherwise uses production copies of data and metadata that are typically stored in a persistent storage medium having fast I/O times. For example, each computing device may regularly access and modify data files and metadata stored on semiconductor memory, a local disk drive or a network-attached storage device. Each of these computing devices may access data and metadata via a file system supported by an operating system of the computing device.

The environment 100 may also include hosted services 122 that provide various online services to the organization or its constituent members (e.g., the organization's departments, employees, independent contractors, etc.) such as social networking services (e.g., Facebook, Twitter, Pinterest), hosted email services (e.g., Gmail, Yahoo Mail, Hotmail), or hosted productivity applications or other hosted applications (e.g., Microsoft Office 365, Google Docs, Salesforce.com). Hosted services may include software-as-a-service (SaaS), platform-as-a-service (PaaS), application service providers (ASPS), cloud services, and all manner of delivering computing or functionality via a network. As it provides services to users, each hosted service may generate additional "hosted data and metadata" that is associated with each user. For example, Facebook may generate and store photos, wall posts, notes, videos, and other content that are associated with a particular Facebook user's account.

The organization directly or indirectly employs an information management system 150 to protect and manage the data and metadata used by the various computing devices in the environment 100 and the data and metadata that is maintained by hosted services on behalf of users associated with the organization. One example of an information management system is the CommVault Simpana system, available from CommVault Systems, Inc. of Oceanport, N.J. The information management system creates and manages non-production copies of the data and metadata to meet information management goals, such as: permitting the organization to restore data, metadata or both data and metadata if an original copy of the data/metadata is lost (e.g., by deletion, corruption, or disaster, or because of a service interruption by a hosted service); allowing data to be recovered from a previous time; complying with regulatory data retention and electronic discovery ("e-discovery") requirements; reducing the amount of data storage media used; facilitating data organization and search; improving user access to data files across multiple computing devices and/or hosted services; and implementing information lifecycle management ("ILM") or other data retention policies for the organization. The information management system 150 may create the additional non-production copies of the data and metadata on any suitable non-production storage medium such as magnetic disks 155, magnetic tapes 160, other storage media 165 such as solid-state storage devices or optical disks, or on cloud data storage sites 170 (e.g. those operated by third-party vendors). Further details on the information management system may be found in the assignee's U.S. patent application Ser. No. 12/751,850, filed Mar. 31, 2010 entitled DATA OBJECT STORE AND SERVER FOR A CLOUD STORAGE ENVIRONMENT, INCLUDING DATA DEDUPLICATION AND DATA MANAGEMENT ACROSS MULTIPLE CLOUD STORAGE SITES, now U.S. Patent Publication Number 2010-0332456, which is hereby incorporated by reference herein in its entirety.

Figure 2:
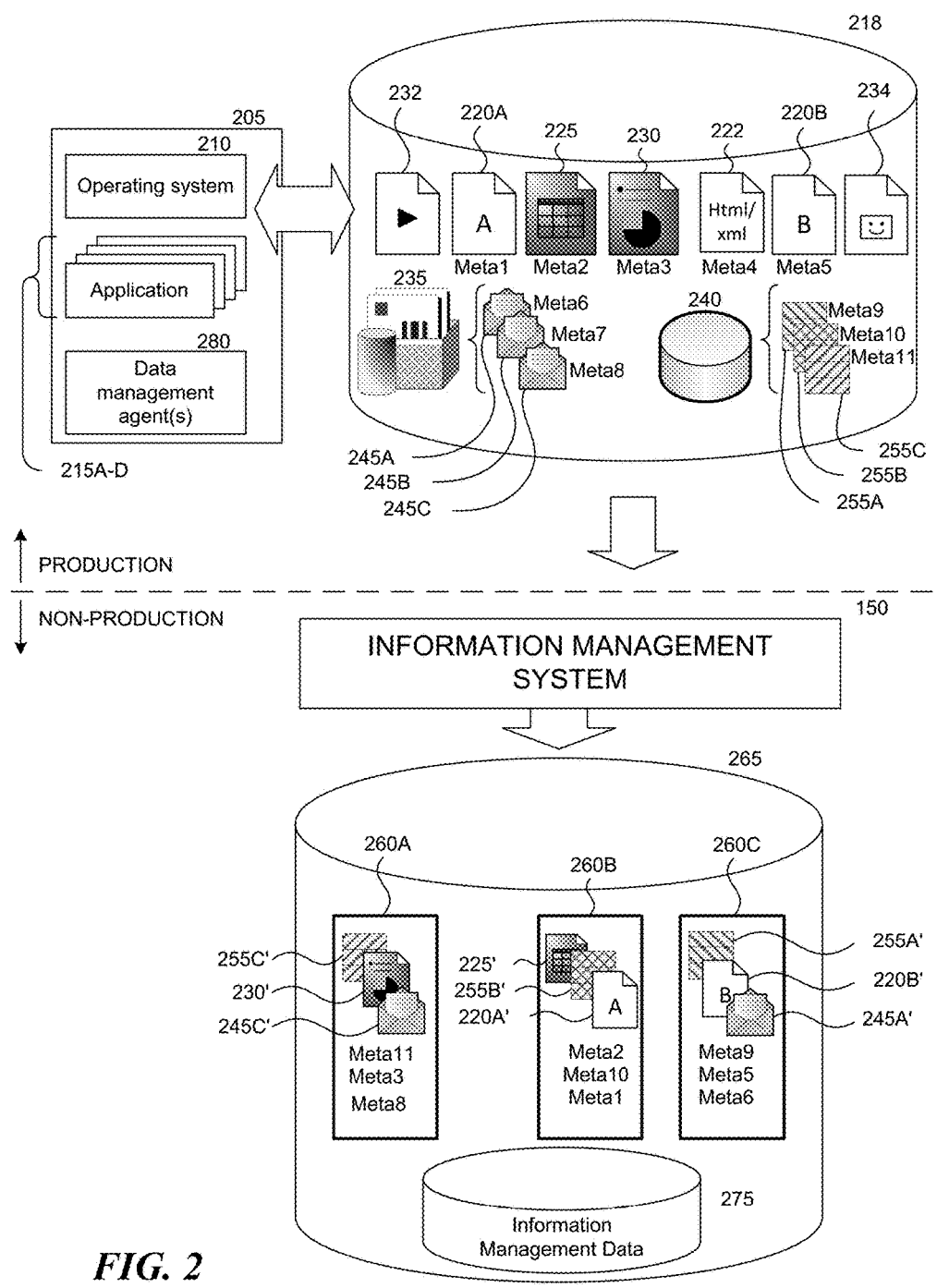
FIG. 2 illustrates examples of production and non-production data that may be processed by the information management environment of FIG. 1.

FIG. 2 helps illustrates some differences between "production copies" of data and metadata and "non-production copies" of data and metadata in the data management environment 100. As shown, each computing device 205 in the environment 100 has at least one operating system 210 installed and one or more applications 215A-D, such as mail server applications, file server applications, mail client applications, database applications, word processing applications, spreadsheet applications, presentation applications, browser applications, mobile applications, entertainment applications, and so on. Each application can access and modify various production copies of files stored in a production data storage medium 218, which may be a network attached storage filer or form part of a Hadoop distributed file system, Open VMS file system, or other type of distributed file system, simply by making conventional file system calls via the operating system 210, without needing the information management system 150 to intervene on behalf of the operating system or application. The production copies of files may include structured data (e.g., database files), unstructured data (e.g., documents), and/or semi-structured data, and thus may include one or more documents 220A-B, spreadsheets 225, presentation documents 230, video files 232, image files 234, email mailboxes 235, html/xml or other types of markup language files 222, and/or databases 240. The operating system 210 may also access and modify production copies of files and other data, such as files in a system volume and/or boot volume. The hosted data and metadata used by a hosted service are also "production copies" of data and metadata since the hosted service accesses and modifies the user's data and metadata as part of its services. Production copies of data may include not only files, but also subsets of files, each of which a related application 215 or the operating system 210 treats as an independent functional unit, but which is not separately addressed in the associated file system. For example, a single email mailbox 235 may include multiple email messages 245A-C, email headers, and attachments. As another example, a single database 240 may include multiple tables 255A-C. As used herein, a "data object" refers to both (1) any file that is currently or previously addressable by a file system and (2) a functional subset of such a file that has a particular function for a related application 215A-D or the operating system 210. Each data object may be further decomposed into one or more data blocks each of which is a collection of data bits within the data object that may not have any particular function for a related application or the operating system. In addition to data objects, the operating system 210 and applications 215A-D may also access and modify production copies of metadata, such as boot sectors, partition layouts, file or data object metadata (e.g., file name, file size, creation/modification/access timestamps, file location within a file folder directory structure, user permissions, owners, groups, access control lists ("ACLs")), and system metadata (e.g., registry information). In addition to metadata generated by or related to file systems and operating systems, some applications maintain indices of production metadata for data objects, e.g., metadata associated with individual email messages. Thus, as shown in FIG. 2, each data object may be associated with a production copy of object metadata ("Meta1-11"), which may be file system metadata and/or application-specific metadata.

The information management system 150 accesses or receives copies of the various production copies of data objects and metadata, and via an information management operation (such as a backup operation, archive operation, or snapshot operation), creates non-production copies of these data objects and metadata, often stored in one or more non-production storage mediums 265 different than the production storage medium 218 where the production copies of the data objects and metadata reside. A non-production copy of a data object represents the production data object and its associated metadata at a particular point in time (non-production objects 260A-C). Since a production copy of a data object or metadata changes over time as it is modified by an application 215, hosted service 122, or the operating system 210, the information management system 150 may create and manage multiple non-production copies of a particular data object or metadata, each representing the state of the production data object or metadata at a particular point in time. Moreover, since a production copy of a data object may eventually be deleted from the production data storage medium and the file system from which it originated, the information management system may continue to manage point-in-time representations of that data object, even though a production copy of the data object itself no longer exists.

For virtualized computing devices, such as virtual machines, the operating system 210 and applications 215A-D may be running on top of virtualization software, and the production data storage medium 218 may be a virtual disk created on a physical medium such as a physical disk. The information management system may create non-production copies of the discrete data objects stored in a virtual disk file (e.g., documents, email mailboxes, and spreadsheets) and/or non-production copies of the entire virtual disk file itself (e.g., a non-production copy of an entire .vmdk file).

Each non-production object 260A-C may contain copies of or otherwise represent more than one production data object. For example, non-production object 260A represents three separate production data objects 255C, 230 and 245C (represented as 245C', 230' and 245', respectively). Moreover, as indicated by the prime mark ('), a non-production object may store a representation of a production data object or metadata differently than the original format of the data object or metadata, e.g., in a compressed, encrypted, deduplicated, or otherwise optimized format. Although FIG. 2 shows that a single production data object (e.g., 255C), and its associated data object metadata (e.g., Meta11) are represented by the contents of only a single non-production object (e.g., 260A), the entire contents of a single production data object and/or its metadata at a particular point in time may instead span across numerous non-production objects. Also a single non-production object 260 may contain copies of or otherwise represent production data objects that originated from different computing devices.

Non-production copies include backup copies, archive copies, and snapshot copies. Backup copies are generally used for shorter-term data protection and restoration purposes and may be in a native application format or in a non-native format (e.g., compressed, encrypted, deduplicated, and/or otherwise modified from the original application format). Archive copies are generally used for long-term data storage purposes and may be compressed, encrypted, deduplicated and/or otherwise modified from the original application format. In some examples, when an archive copy of a data object is made, a logical reference or stub may be used to replace the production copy of the data object in the production storage medium 218. In such examples, the stub may point to or otherwise reference the archive copy of the data object stored in the non-production storage medium so that the information management system can retrieve the archive copy if needed. The stub may also include some metadata associated with the data object, so that a file system and/or application can provide some information about the data object and/or a limited-functionality version (e.g., a preview) of the data object. A snapshot copy represents a data object at a particular point in time. A snapshot copy can be made quickly and without significantly impacting production computing resources because large amounts of data need not be copied or moved. A snapshot copy may include a set of pointers derived from the file system or an application, where each pointer points to a respective stored data block, so collectively, the set of pointers reflect the storage location and state of the data object at a particular point in time when the snapshot copy was created. In "copy-on-write", if a block of data is to be deleted or changed, the snapshot process writes the block to a particular data storage location, and the pointer for that block is now directed to that particular location. The set of pointers and/or the set of blocks pointed to by a snapshot may be stored within the production data storage medium 218.

Non-production copies of a data object or metadata may be distinguished from a production copy of a data object or metadata in several ways. First, a non-production copy of a data object is created to meet the different information management goals described above and is not directly used or modified by applications 215A-D, hosted services 122, or the operating system 210. Second, a non-production copy of a data object is stored as one or more non-production objects 260 that may have a format different from the native application format of the production copy of the data object, and thus often cannot be directly used by the native application or a hosted service 122 without first being modified. Third, non-production objects are often stored on a non-production storage medium 265 that is inaccessible to the applications 215A-D running on computing devices and hosted services 122. Also, some non-production copies may be "offline copies," in that they are not readily available (e.g. not mounted tape or disk.) Offline copies include copies of data that the information management system can access without any human intervention (e.g. tapes within an automated tape library, but not yet mounted in a drive), and copies that the information management system 150 can access only with at least some human intervention (e.g. tapes located at an offsite storage site).

The information management system 150 also generates information management data 275, such as indexing information, that permit the information management system to perform its various information management tasks. As shown in FIG. 2, a computing device 205 may include one or more data management agents 280 that provide client-side functions for the information management system.

Information Management System

Figure 3:
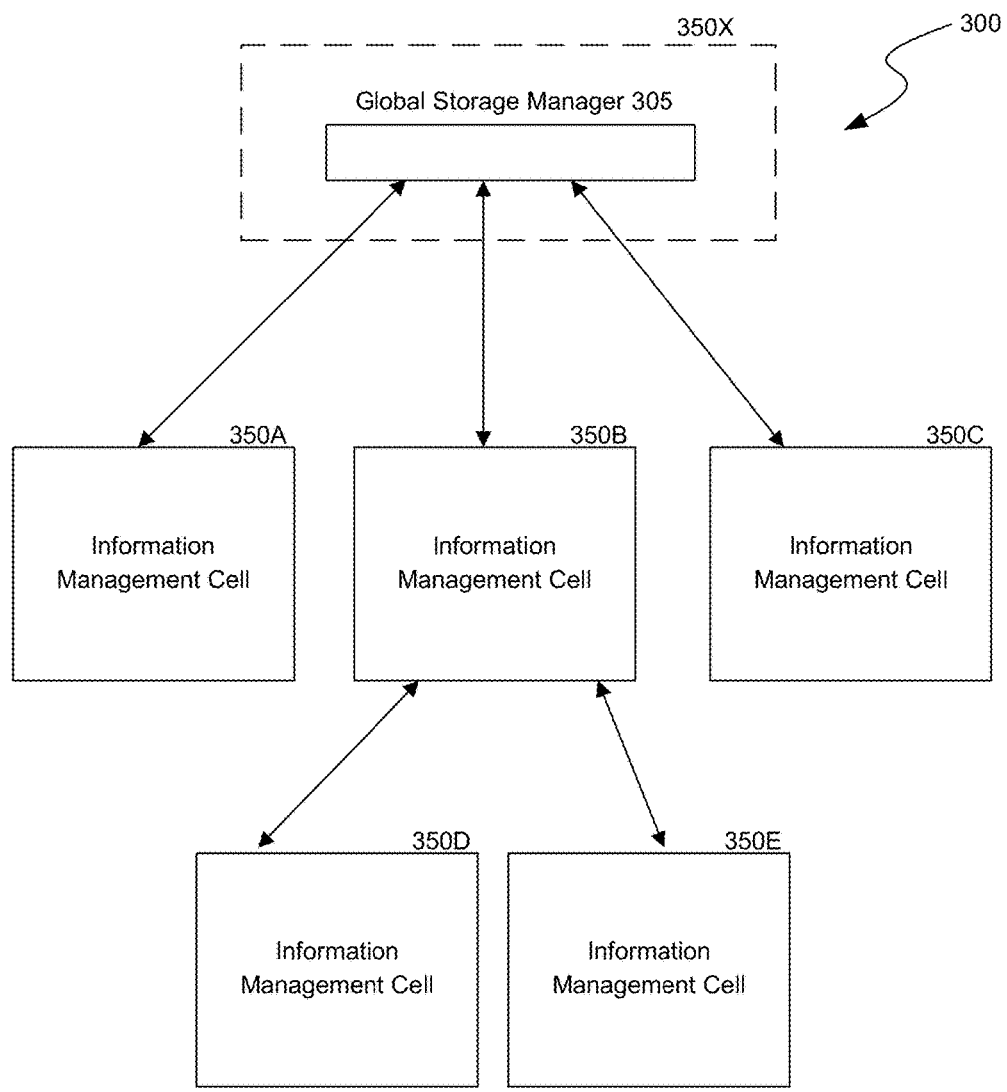
FIG. 3 is a block diagram illustrating one example of a hierarchical arrangement of resources for the information management system of FIG. 1, including information management cells.

FIG. 3 shows a hierarchical arrangement of resources that may form an information management system 150. As shown, the information management system 150 includes multiple information management cells 350 arranged in a hierarchy, with some information management cells (e.g., 350D-E) subordinate to other information management cells (e.g., 350B). A global storage manager 305, which may form part of a global information cell 350x, manages the overall hierarchy of information management cells by receiving reports from the various subordinate information management cells related to the operation of the cells, determining global information management policies in light of received reports, and pushing information management policies towards subordinate cells for implementation. The global storage manager may also maintain and disseminate, to the various cells, system-wide information management data. A superior information management cell (e.g., 350B), may perform similar tasks for its subordinate cells (e.g., 350D-E) and/or otherwise act as an intermediary between the subordinate cells and the global storage manager 305.

Information Management Cell

Figure 4:
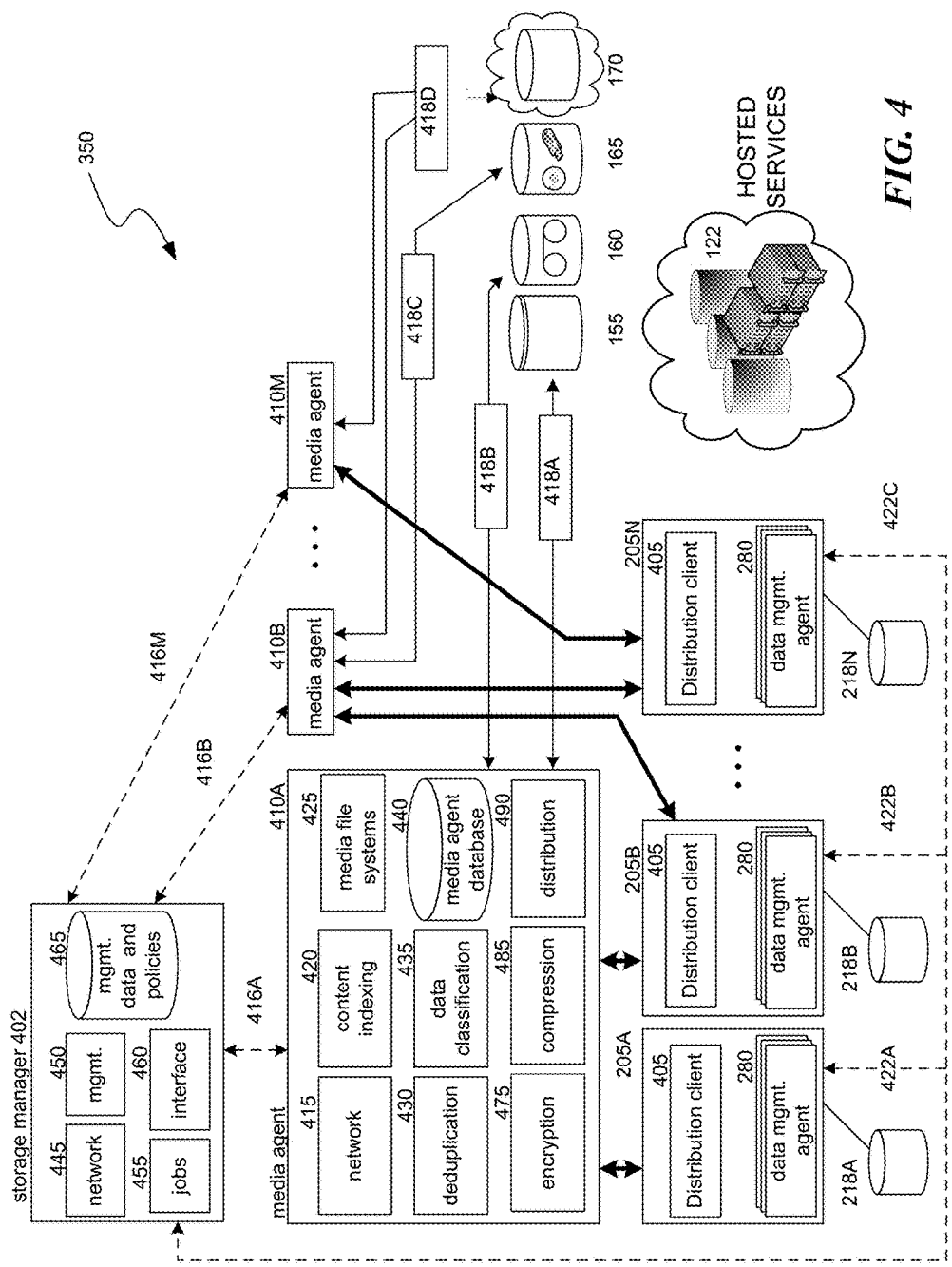
FIG. 4 is a block diagram illustrating an example of resources forming an information management cell.

FIG. 4 shows an arrangement of resources that may form an information management cell 350. As shown, the information management cell includes a storage manager 402, one or more media agents 410A-M, one or more non-production storage mediums 155-870, one or more computing devices 205A-N, and one or more production data storage mediums 218A-N. Outside of the information management cell are hosted services 122, which may interact with media agents 410 and its components, as described further herein. In some examples, all or a portion of an information management cell may be implemented as an object store, as described in assignee's U.S. patent application Ser. No. 12/751,850 (introduced more fully and incorporated by reference above).

The storage manager 402 may be a software module or other application that coordinates and controls information management operations performed by one or more information management cells 350 to protect and control copies of non-production data objects and metadata. As shown by the dashed lines 416 and 422, the storage manager may communicate with some or all elements of the information management cell 350, such as the media agents 410 and computing devices 205, to initiate and manage backup operations, snapshot operations, archive operations, data replication operations, data migrations, data distributions, data recovery, and other information management operations. The storage manager may control additional information management operations including ILM, deduplication, content indexing, data classification, data mining or searching, e-discovery management, collaborative searching, encryption, and compression. Alternatively or additionally, a storage manager may control the creation and management of disaster recovery copies, which are often created as secondary, high-availability disk copies, using auxiliary copy or replication technologies.

The storage manager 402 may include a jobs agent 455, a management agent 450, a network agent 445, and an interface agent 460, all of which may be implemented as interconnected software modules or application programs. The jobs agent 455 monitors the status of information management operations previously performed, currently being performed, or scheduled to be performed by the information management cell 350. The management agent 450 provides an interface that allows various management agents 450 in multiple information management cells 350 (or in a global storage manager 305) to communicate with one another. This allows each information management cell 350 to exchange status information, routing information, capacity and utilization information, and information management operation instructions or policies with other cells. In general, the network agent 445 provides the storage manager 402 with the ability to communicate with other components within the information management cell and the larger information management system, e.g., via proprietary or non-proprietary network protocols and application programming interfaces ("APIs") (including HTTP, HTTPS, FTP, REST, virtualization software APIs, cloud service provider APIs, hosted service provider APIs). The interface agent 460 includes information processing and display software, such as a graphical user interface ("GUI"), an API, or other interactive interface through which users and system processes can retrieve information about the status of information management operations or issue instructions to the information management cell and its constituent components. The storage manager 402 may also track information that permits it to select, designate, or otherwise identify content indices, deduplication databases, or similar databases within its information management cell (or another cell) to be searched in response to certain queries.

The storage manager 402 may also maintain information management data, such as a database 465 of management data and policies. The database 465 may include a management index that stores logical associations between components of the system, user preferences, user profiles (that among other things, map particular information management users to computing devices or hosted services), management tasks, or other useful data. The database 465 may also include various "information management policies," which are generally data structures or other information sources that each includes a set of criteria and rules associated with performing an information management operation. The criteria may be used to determine which rules apply to a particular data object, system component, or information management operation, an may include:

- frequency with which a production or non-production copy of a data object or metadata has been or is predicted to be used, accessed, or modified;
- access control lists or other security information;
- the sensitivity (e.g., confidentiality) of a data object as determined by its content and/or metadata;
- time-related factors;
- deduplication information;
- the computing device, hosted service, computing process, or user that created, modified, or accessed a production copy of a data object; and
- an estimated or historic usage or cost associated with different components.

The rules may specify, among other things:

- a schedule for performing information management operations,
- a location (or a class or quality of storage media) for storing a non-production copy,
- preferences regarding the encryption, compression, or deduplication of a non-production copy,
- resource allocation between different computing devices or other system components (e.g., bandwidth, storage capacity),
- whether and how to synchronize or otherwise distribute files or other data objects across multiple computing devices or hosted services,
- network pathways and components to utilize (e.g., to transfer data) during an information management operation, and
- retention policies (e.g., the length of time a non-production copy should be retained in a particular class of storage media).

As noted above, each computing device 205 may include one or more data management agents 280. Each data management agent is a software module or component that helps govern communications with other system components. For example, the data management agent receives commands from the storage manager 402 and sends to and receives from media agents 410 copies of data objects, metadata, and other payload (as indicated by the heavy arrows). Each data management agent accesses data and/or metadata stored in a production data storage medium 218 and arranges or packs the data and metadata in a certain format (e.g., backup or archive format) before it is transferred to another component. Each data management agent can also restore a production copy of a data object or metadata in a production data storage medium 218 from a non-production copy. A data management agent may perform some functions provided by a media agent, which are described further herein, such as compression, encryption, or deduplication. Each data management agent may be specialized for a particular application (e.g. a specified data management agent customized to handle data generated or used by Exchange by Microsoft Corp.). Alternatively or additionally, a more generic data management agent may handle data generated or used by two or more applications.

Each computing device 205 may also include a data distribution and live browsing client module 405 (herein "distribution client module"). The distribution client module 405 is responsible for, inter alia, associating mobile devices and/or hosted service accounts with users of the information management system, setting information management policies for mobile and other computing devices, pushing data objects to a distribution module for distribution to other computing devices, providing unified access to a user's data via an interface, and providing live browsing features. The various functions of the distribution client module are described in greater detail herein.

A media agent 410, which may be implemented as a software module, conveys data, as directed by the storage manager 402, between a computing device 205 (or hosted service 122) and one or more non-production storage mediums 155-870. Each media agent 410 may control one or more intermediary storage devices 418, such as a cloud server or a tape or magnetic disk library management system, to read, write, or otherwise manipulate data stored in a non-production storage medium 155-870. Each media agent 410 may be considered to be "associated with" a storage device and its related non-production storage media if that media agent is capable of routing data to and storing data in the storage media managed by the particular storage device. A media agent may communicate with computing devices 205, hosted services 122, storage devices 418A-D, and the storage manager 402 via any suitable communications path, including SCSI, a Storage Area Network ("SAN"), a Fibre Channel communications link, or a wired, wireless, or partially wired/wireless computer or telecommunications network, including the Internet.

To perform its functions, the media agent 410 may include a media file system module 425, a data classification module 435, a content indexing module 420, a deduplication module 430, an encryption module 475, a compression module 485, a network module 415, a distribution module 490, and a media agent database 440. The media file system module 425 is responsible for reading, writing, archiving, copying, migrating, restoring, accessing, moving, sparsifying, deleting, sanitizing, destroying, or otherwise performing file system operations on various non-production storage devices of disparate types. The media file system module may also instruct the storage device to use a robotic arm or other retrieval means to load or eject certain storage media such as a tape.

The network module 415 permits the media agent to communicate with other components within the system and hosted services 122 via one or more proprietary and/or non-proprietary network protocols or APIs (including cloud service provider APIs, virtual machine management APIs, and hosted service provider APIs). The deduplication module 430 performs deduplication of data objects and/or data blocks to reduce data redundancy in the cell. The deduplication module may generate and store data structures to manage deduplicated data objects, such as deduplication tables, in the media agent database 440. The encryption module 475 performs encryption of data objects, data blocks, or non-production objects to ensure data security in the cell. The compression module 485 performs compression of data objects, data blocks, or non-production objects to reduce the data capacity needed in the cell.

The content indexing module 420 analyzes the contents of production copies or non-production copies of data objects and/or their associated metadata and catalogues the results of this analysis, along with the storage locations of (or references to) the production or non-production copies, in a content index stored within a media agent database 440. The results may also be stored elsewhere in the system, e.g., in the storage manager 402, along with a non-production copy of the data objects, and/or an index cache. Such index data provides the media agent 410 or another device with an efficient mechanism for locating production copies and/or non-production copies of data objects that match particular criteria. The index data or other analyses of data objects or metadata may also be used by the data classification module 435 to associate data objects with classification identifiers (such as classification tags) in the media agent database 440 (or other indices) to facilitate information management policies and searches of stored data objects.

The distribution module 490 may be a set of instructions that coordinates the distribution of data objects and indices of data objects. The distribution may occur from one computing device 205 to another computing device 205 and/or from hosted services 122 to computing devices 205. As a first example, the distribution module may collect and manage data and metadata from hosted services 122 or mobile devices 205. As another example, the distribution module may synchronize data files or other data objects that are modified on one computing device so that the same modified files or objects are available on another computing device. As yet another example, the distribution module may distribute indices of data objects that originated from multiple computing devices and/or hosted services, so a user can access all of their data objects through a unified user interface or a native application on their computing device. The distribution module may also initiate "live browse" sessions to permit communications between different computing devices so that the devices can interchange data and metadata or so the devices can provide computing resources, such as applications, to each other. The functions performed by the distribution module are described in greater detail herein.

Manacling Hosted Data

Figure 5:
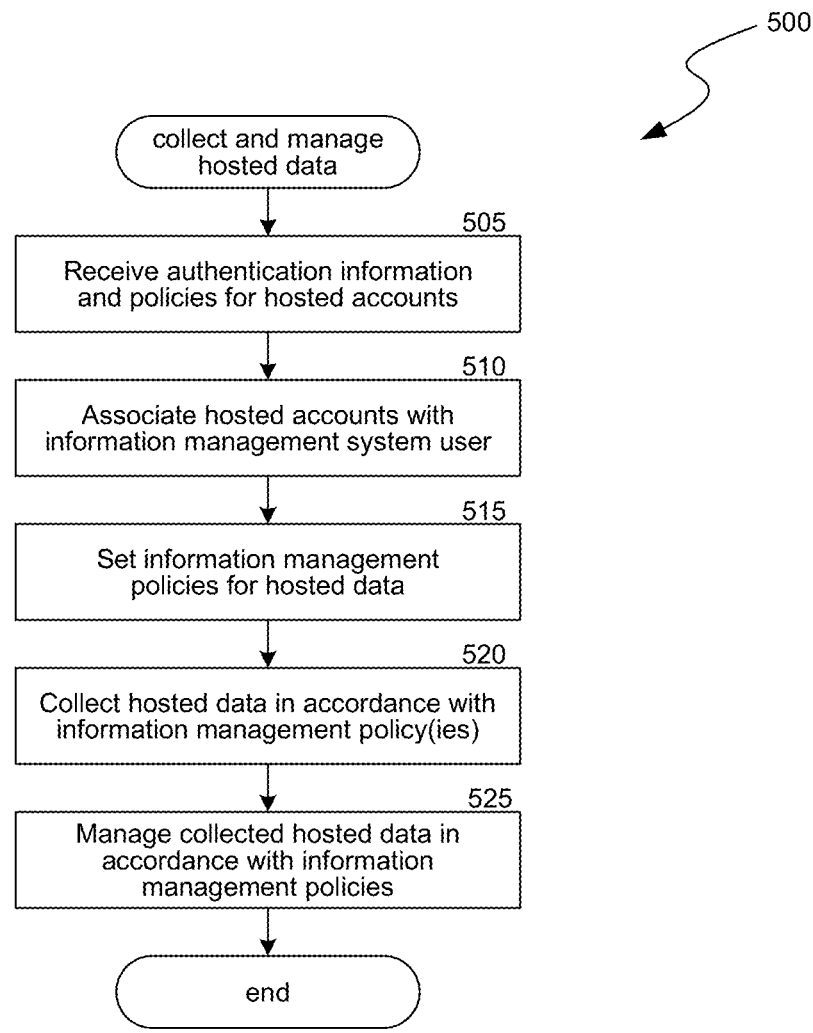
FIG. 5 is a flow chart that illustrates a process for collecting and managing a user's hosted data.

To provide comprehensive management of all of an organization's data, the information management system 150 (or IMS) may collect and manage hosted data associated with individual users of the IMS, such as individual employees or members of the organization that operate or utilize the IMS. FIG. 5 shows a process 500 for collecting and managing hosted data in an information management system. The process 500 may be performed by the distribution module 490 or another system component. The process 500 begins at block 505, where the distribution module receives authentication information and information management policies for the hosted services accounts (or simply "hosted accounts") associated with a user of the information management system. For example, the distribution module may receive an indication that the distribution module should periodically collect copies of the data and metadata associated with the user's hosted accounts on social networking sites (e.g., Facebook, Foursquare, Twitter), hosted email services (e.g., Gmail, Yahoo mail, Hotmail), hosted applications (e.g., Office 365, Google Documents, and Salesforce), or other hosted services.

Figure 6:
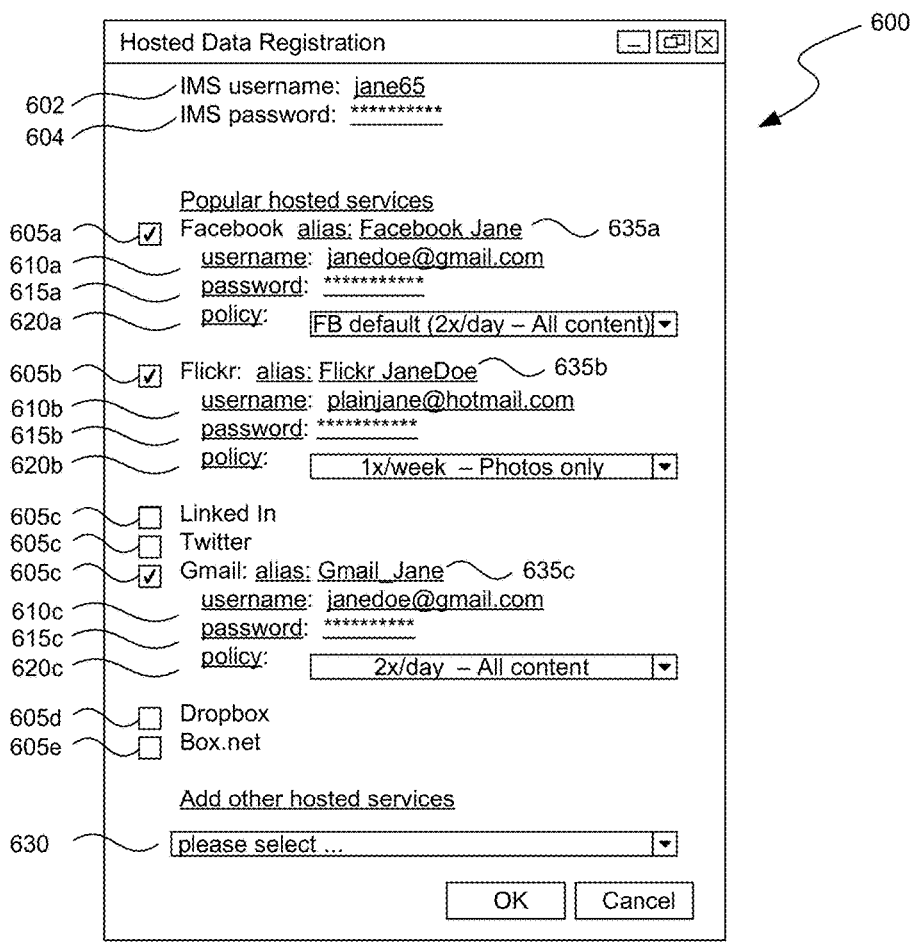
FIG. 6 illustrates an example of a graphical user interface for receiving authentication information and information management policies for hosted accounts.

FIG. 6 illustrates one example of a graphical user interface 600 that the distribution module may provide in order to receive authentication information and information management policies for hosted accounts. As shown, the interface 600 may include IMS username and password fields 602 and 604 so that the user can provide authentication information or other credentials that identify the person as a registered user of the information management system 150 (e.g., as IMS user "jane65"). Alternatively, the IMS user may be identified using credentials obtained from an operating system or directory or security service, such as an Active Directory service. Although not shown, the interface 600 may also include a field to permit the IMS user to provide an identifier associated with the particular IMS they are associated with.

The interface 600 also includes several selection boxes 605 or similar elements to permit the user to identify the hosted accounts the user has. For illustrative purposes, the interface 600 shows only the hosted services Facebook, Flickr, LinkedIn, Twitter, Gmail, Dropbox, and Box.net. However, as indicated by the services selection field 630, the information management system may also support numerous other hosted services, including practically any hosted service that generates production data and metadata for a user and provides APIs or other interfaces that permit the distribution module to access the user's data and metadata. For each selected service, the interface 600 provides username and password fields, 610 and 615, where the user can enter hosted account authentication information or credentials to permit the IMS to access the user's data and metadata hosted on the service.

For each selected service, the interface also includes a policy selection dropdown menu 620 or similar selection means so that the user can associate the selected service with a particular information management policy for collecting and managing the service's hosted data and metadata. A policy may include any of the criteria and rules described above in connection with the discussion of information management policies generally. The selected policy may specify how frequently the distribution module should collect hosted data from the service, the type or other characteristics of hosted data that the distribution module should collect (e.g., all data versus photos versus documents, etc.), and/or the types of information management operations that the IMS should perform on collected hosted data (e.g., deduplication, content indexing, data classification, archiving, back up operations, etc.). The selected policy may also specify where or how non-production copies of the hosted data should be stored. The interface can include options for all of these criteria and rules, as well as other criteria and rules.

As shown with element 620*a*, to simplify the user experience, the interface 600 may provide a suggested default or mandatory policy (e.g., "FB default" policy) for each service (e.g., all data content is collected twice a day). For each selected service, the interface 600 may also include an alias field 635 where a user can provide a descriptive alias for the hosted account, to permit the user and the IMS to readily identify the hosted account as a data source for the user.

The interface 600 may be presented to a user via a web browser (e.g., as a web portal), or may be presented to a user via a mobile application or other application installed on the user's computing device, such as a mobile device. For example, the interface 600 may be provided by the same application used to produce the interface 770, which is described further herein. In examples where the interface 600 is presented via a mobile application, some or all of the entry fields may be auto-populated by the application. For example, the application producing interface 600 may detect other applications installed on the mobile device that are associated with hosted services or local data related to these other applications. For example, the application used to produce interface 600 may detect that a user's mobile device has a Facebook application installed and may therefore automatically select "Facebook."

Although not shown in FIG. 6, it should be noted that the information management system 150 permits administrators of the information management system 150 to define or modify information management policies for the hosted data of other users, including policies that prohibit the collection and management of certain hosted data. For example, an IMS administrator may create a system-wide policy that specifies that photos or videos that originate from any employee's Facebook hosted account cannot be collected. The IMS may disregard or override any information management policies set by an individual user to the extent that those individual rules are contrary to an administrator-defined policy.

Returning to the process 500 of FIG. 5, at block 510, the distribution module 490 associates the hosted account information received at block 505 with the IMS user. For example, in an IMS user profile data structure, the distribution module may associate the IMS user identified by fields 602 and 604 with the hosted services, aliases, authentication information, and policies received at block 505.

At block 515, the distribution module 490 sets or adjusts information management policies to govern the collection and management of the hosted data associated with the user. For example, in accordance with the user's policy preferences that were received at block 505 (and any administrator-defined policies), for each hosted service selected, the distribution module may set a policy specifying which of the user's hosted data should be collected from the service and the schedule for collecting the hosted data. Continuing the previous example, the distribution module may set a policy to collect all of the user jane65's data and metadata from her "Facebook Jane" account twice a day.

At block 520, the distribution module 490 collects hosted data and metadata in accordance with the applicable information management policies that were set at block 515. To do so, the distribution module may utilize general or service-specific APIs to request any new data or metadata associated with a user's hosted account on the prescribed schedule. As part of its request, the distribution module may provide the authentication or credential information (e.g., username/password or other credentials) that it received at block 505 in order to gain access to the user's hosted data and metadata.

The process 500 ends at block 525, where the distribution module 490 manages collected hosted data in accordance with applicable information management policies. For example, the distribution module may perform deduplication, content indexing, data classification, and/or archiving; create additional non-production copies (e.g., backup copies or archive copies); restore copies of the data and metadata to a production location; or perform information lifecycle management of the hosted data in accordance with the applicable information management policies set at block 515.

In some examples, the distribution module may restore or expose hosted data at a new location that is different from its original hosted location so that an organization can interact with the data in a different fashion. For example, the distribution module may restore IMAP data that was generated by a first hosted email service (e.g., Gmail) so that it is accessible via a second hosted email service (e.g., Hotmail) or a local email client (e.g., Outlook). As another example, the distribution module may restore hosted data to an organization's network attached storage filer. In such an example, data that was previously accessible only via a service-specific API of a hosted service would now be accessible to the organization via Network File System or Common Internet File System protocols.

Managing Mobile Device Data

Figure 7A:
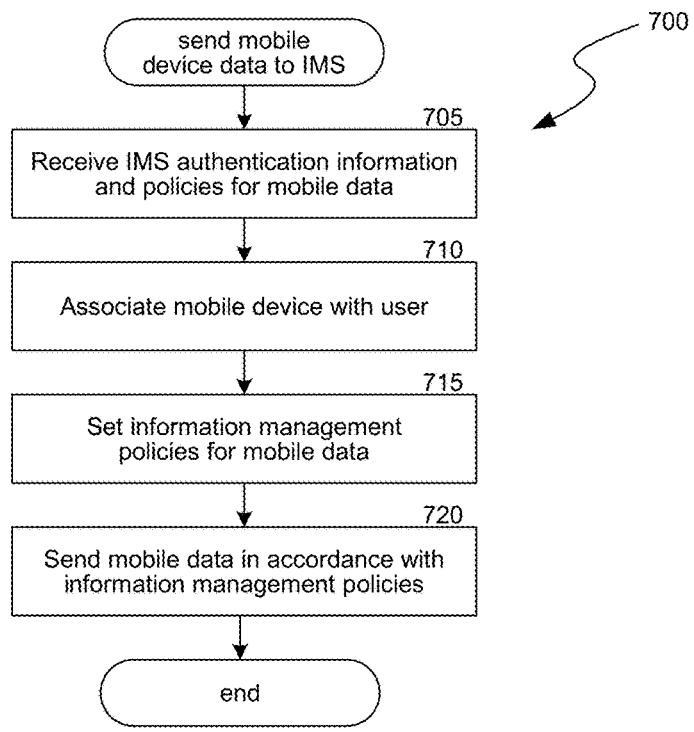
FIG. 7A is a flow chart that illustrates a process for sending mobile device data to an information management system that may be performed at a mobile device.

To provide comprehensive management of all of an organization's data, the information management system 150 may also collect and manage data and metadata generated by the mobile devices owned or used by individual users of the IMS, such as individual employees or members of the organization that operates or utilizes the IMS. For example, the IMS may collect and manage all employees' data and metadata generated from smartphones, tablet computers, laptops and/or other mobile devices (which may be referred to herein simply as "mobile data"). FIG. 7A is a flow chart that illustrates a process 700 for sending mobile data to an information management system that may be performed at a mobile device, e.g., by the distribution client module 405. In some examples, before the process 700, the distribution client module 405 and accompanying data management agents 280 are downloaded and installed on a user's mobile device as a mobile application (e.g., via a company's intranet, via an "app store" or via another distribution channel).

The process 700 begins at block 705, where the distribution client module 405 receives IMS authentication information and management policies for the mobile data from a mobile device. FIG. 7C illustrates one example of a graphical user interface 770 that the distribution client module may provide on the mobile device in order to receive authentication information and management policies. As shown, the interface 770 may include IMS username and password fields, 772 and 774, so that the user of the mobile device can provide authentication information or credentials that identify the person as a registered user of the information management system 150 (e.g., as IMS user "jane65"). Although not shown, the interface 770 may also include a field to permit the IMS user to provide an identifier associated with the particular IMS she is associated with. The interface 770 also includes a device alias field 775 whereby a user can provide a descriptive alias for the mobile device that permits the user and the IMS to readily identify the mobile device as a data source for the user.

The interface 770 includes several selection boxes 776 or similar elements to permit the user to identify what types of mobile data from the mobile device the user wants the IMS to collect and manage. For illustrative purposes, the interface 770 shows only the data types of pictures, documents, emails, applications and application data. However, as indicated by the selection field 776e, the information management system may also support the collection and management of numerous other types of mobile data. Moreover, in some examples, the interface 770 permits a user to define more granular criteria for the mobile data that should be collected and managed by the IMS. For example, the interface 770 might permit a user to define which particular applications and application data are collected and managed and/or might permit the user to define other selection criteria (such as file size, file extension, or particular source directory folders on a mobile device).

The interface 770 also includes policy selection menus 778 or similar selection means so that the user can associate each selected data type (or all data types) with a particular information management policy for collecting, managing or distributing the selected type of data. A selected policy may include any of the criteria and rules described above in connection with the discussion of information management policies generally. A selected policy may specify the frequency with which the distribution client module collects data from the mobile device, the type of network connectivity that can or cannot be used for data collection or distribution (e.g., a WiFi connection or a domestic cellular network), a specific "blacklist" of network access points or IP addresses that cannot be used for data collection or distribution, a specific "whitelist" of network access points or IP addresses that may be used for data collection or distribution, and operating conditions such as battery life that must be satisfied during data collection or distribution. The policy may also specify that certain data objects cannot be opened on the mobile device unless the mobile device is within a certain IP address range or connected via a specific network. The policy may specify particular directories on the mobile device file system for which data should be collected and managed. The policy selected may also specify the types of information management operations that should be performed on the mobile data after it is collected (e.g., deduplication, content indexing, data classification, archiving, etc.). The selected policy may also specify where or how non-production copies of the mobile data should be stored. As shown with element 778a, to simplify the user experience, the interface 770 may provide a suggested default or mandatory policy (e.g., a Default policy where data is collected once a day, and only when the mobile device has a WiFi connection). To illustrate the use of the interface 770, in the example shown in FIG. 7C, the IMS user "jane65" has opted to have the pictures, documents, applications and application data on her mobile device sent to the IMS once a day when there is a WiFi connection available.

Although not shown in FIG. 7C, it should be noted that the information management system 150 permits administrators of the information management system to define or modify information management policies for the mobile data of other users, including policies that prohibit the collection and management of certain mobile data. For example, an IMS administrator may create a system-wide policy that specifies that photos that originate from any employee's mobile device cannot be collected. As another example, an IMS administrator may set a policy that prohibits employees from connecting a mobile device to the IMS unless the IMS administrator has already added an identifier for the mobile device (e.g., an IMSI or IMEI) to a system-wide "whitelist" of authorized devices. The IMS may disregard any information management policies set by an individual user to the extent those individual rules are contrary to an administrator-defined policy.

Returning to FIG. 7A, at block 710, the distribution client module 405 associates the mobile device with the user. For example, the distribution client module may send identifying information to the distribution module 490 such as: the IMS user authentication information obtained at block 705 (e.g. "jane65" and password or other credentials), the alias given to the mobile device, and/or identifiers for the mobile device (e.g., hardware, software, or subscriber identifiers associated with the mobile device such as an international mobile equipment identity (IMEI), international mobile subscriber identity (IMSI), and/or MAC address). In response, in an IMS user profile data structure, the distribution module may associate the identified IMS user with the device alias and other identifiers. The distribution module 490 may also provide the distribution client module with an indication of a particular distribution module 490 that will service the mobile device during data collection or distribution.

At block 715, the distribution client module 405 sets or adjusts information management policies to govern the collection and management of the mobile data from the mobile device. For example, in accordance with the user's policy preferences that were received at block 705, for each data type selected, the distribution client module may set a policy specifying the schedule and other rules for sending mobile data to an information management system. Continuing the previous example, the distribution client module may set a policy to collect all of jane65's pictures, documents, applications and application data from the tablet named "Janes tablet" once a day when a WiFi connection is available. The distribution client module may also send the policies to other components, such as a storage manager 402 or the distribution module 490.

Next, at block 720, the distribution client module 405 sends mobile data from the mobile device to an IMS in accordance with the applicable information management policies. The mobile data may be sent opportunistically, e.g., when a high-speed or low cost network connection such as WiFi is available. The distribution client module may instruct data management agents installed 280 on the mobile device to send data both in (1) an initial operation so the IMS can collect existing data objects from the mobile device and (2) in subsequent scheduled operations so the IMS can collect new or modified data objects from the mobile device. Returning to the previous example, after the user preferences have been received at block 705, if a WiFi connection is available, the distribution client module may initially instruct various installed data management agents 280 to package up and send any of jane65's existing pictures, documents, applications and application data from the tablet named "Janes tablet" to a distribution module 490. From thereon, once a day, when a WiFi connection is available on the Janes Tablet device, the distribution client module may instruct various installed data management agents 280 to package up and send any changes to jane65's pictures, documents, applications and application data to the distribution module 490. After block 720 the process 700 ends.

Although the process 700 was described as being performed by a distribution client module 405 on the mobile device whose data is being sent, some or all of the process 700 may be performed by another computing device that acts as an intermediary. For example, a mobile device may tether (physically or wireless) to a laptop or desktop computer and a distribution client module on the laptop or desktop computer may perform some of the steps in the process 700.

Figure 7B:
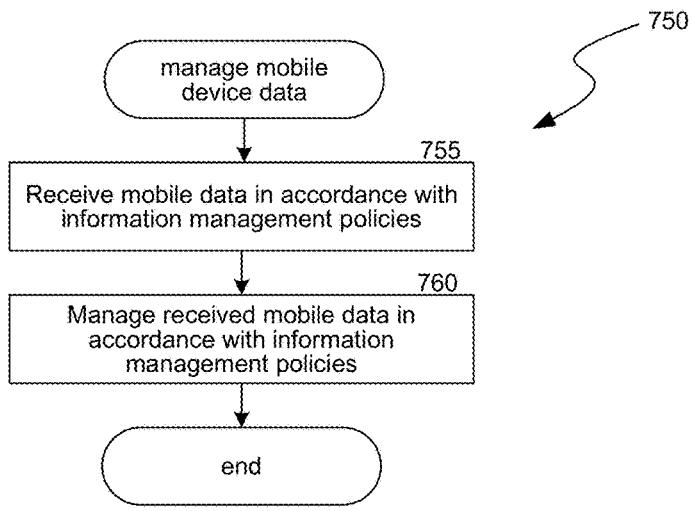
FIG. 7B is a flow chart that illustrates a process for collecting and managing mobile device data that may be performed at a distribution module.
Figure 7C:
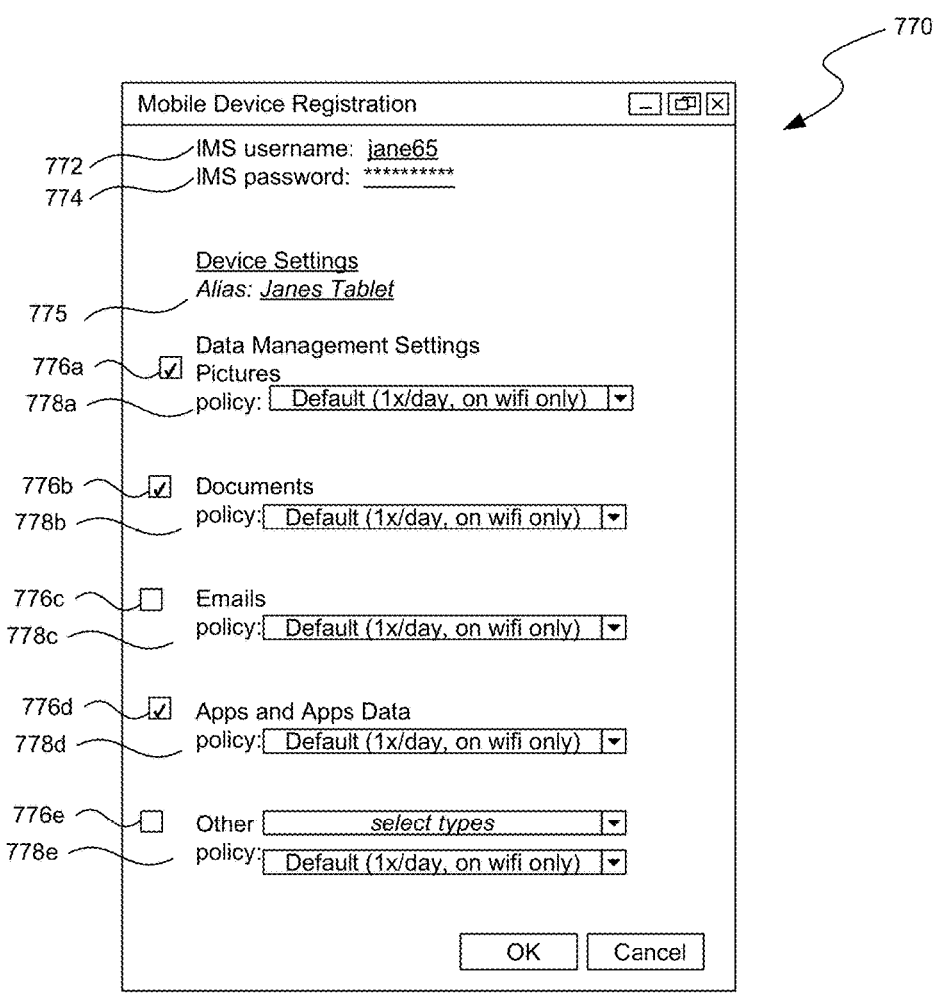
FIG. 7C illustrates one example of a graphical user interface that may be provided in order to receive authentication information and management policies for mobile data.

FIG. 7B is a flow chart that illustrates a process 750 for managing mobile device data that may be performed at a distribution module 490. As shown, the process 750 begins at block 755 where the distribution module receives mobile data in accordance with applicable information management policies, e.g., in response to a distribution client module 405 or a data management agent 280 sending mobile data at block 720 in process 700. At block 760, the distribution module 490 manages the received mobile data in accordance with applicable information management policies, such as the information management policies set at block 715 in process 700. For example, the distribution module may perform deduplication, content indexing, data classification, or archiving of the mobile data; create additional non-production copies of the mobile data (e.g. backup copies or archive copies); restore the mobile data to a new production location; perform information lifecycle management of the mobile data; or perform other information management operations upon the received mobile data. After block 760, the process 750 concludes.

Distributing User's Data

In addition to collecting and managing a user's data from hosted services and/or mobile devices, the information management system 150 may also distribute a user's data and/or indices of a user's data so that the user can obtain a unified view of all of her data, across different hosted services and different computing devices and access all of this data readily. For example, the information management system may permit a user to view all of her mobile data, hosted data, and other data in a manner similar to that shown in FIG. 13, which is discussed in greater detail herein.

Figure 8A:
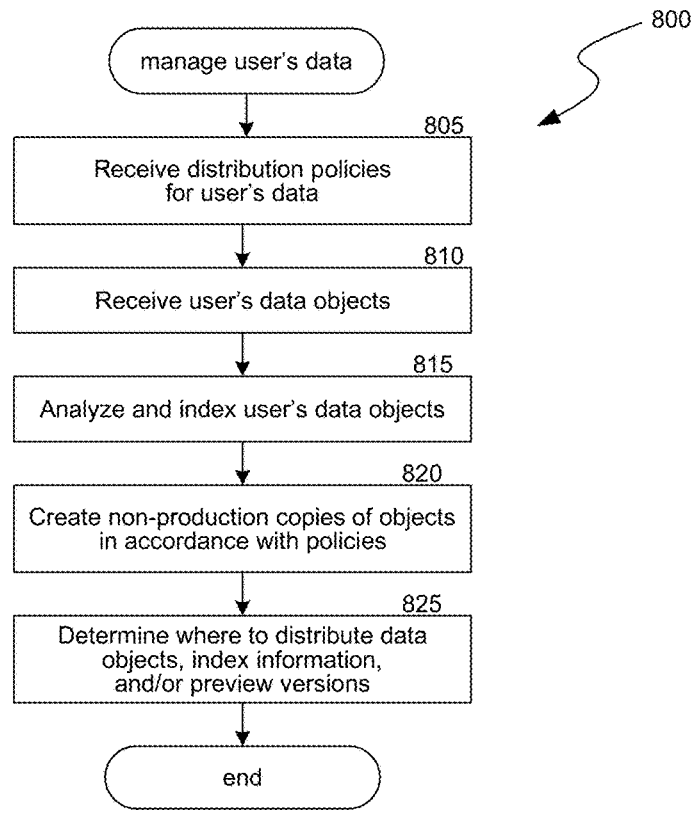
FIG. 8A is a flow chart that illustrates a process for managing a user's data that may be performed at a distribution module.

Before data is distributed, the distribution module 490 may perform various management tasks to facilitate subsequent distribution. FIG. 8A is a flow chart that illustrates a process 800 for managing a user's data that may be performed by a distribution module 490. The process 800 begins at block 805, where the distribution module receives information management policies for a user's data, specifically distribution policies that specify how a user's data should be distributed to different computing devices and/or portals.

Figure 9A:
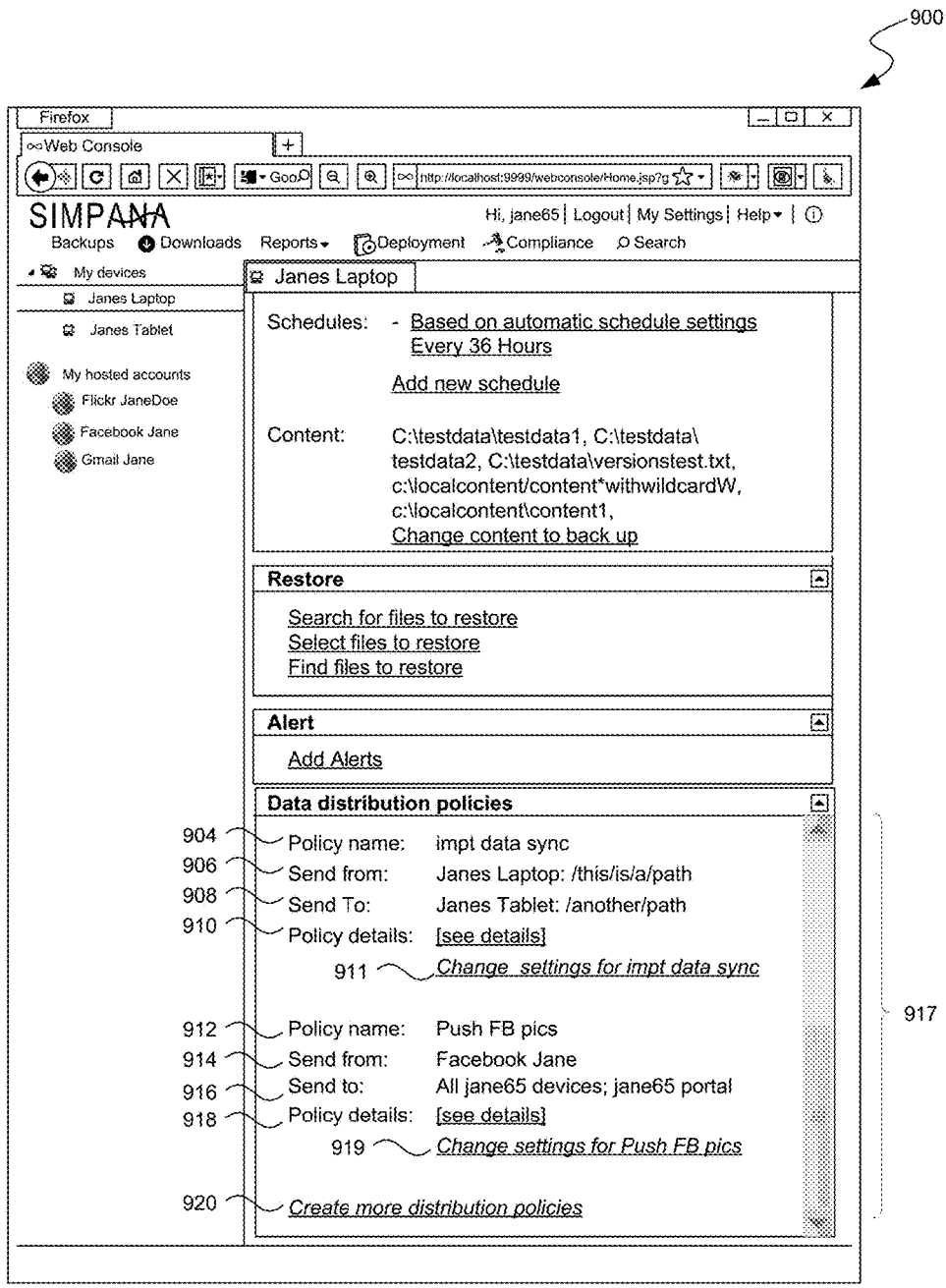
FIG. 9A illustrates an example of a graphical user interface for receiving distribution policies for a user's data.
Figure 9B:
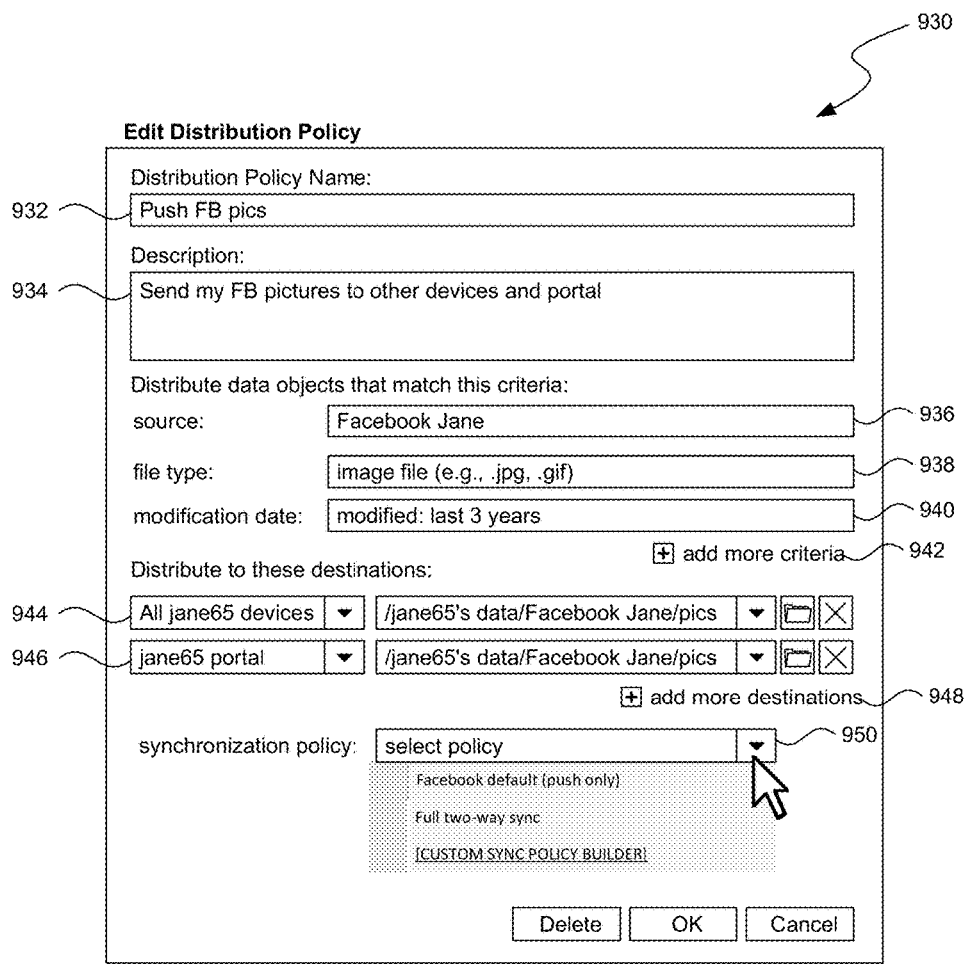
FIG. 9B illustrates an example of a graphical user interface for defining a distribution policy.

FIGS. 9A and 9B show some examples of graphical user interfaces that may be utilized to receive the distribution policies for a user's data. As shown in FIG. 9A, a management interface 900 may reflect numerous user preferences for an information management system (such as backup content and schedules, data restoration options, and alerting options). The management interface 900 includes a subsidiary distribution policies interface 917 that reflects existing distribution policies. The distribution policies interface 917 may show the details of existing distribution policies implemented by the distribution module 490. For example, the portion of the distribution policies interface 917 shown indicates the details of two existing distribution policies. As shown at 904-910, the user "jane65" has defined a first distribution policy called "impt data sync," which entails distributing all of the files in a directory defined by a URL, link or path "/this/is/a/path" from Janes Laptop to Janes Tablet in directory defined by another URL, link or path "/another/path." Second, as shown at 912-918, the user jane65 has also defined a second distribution policy called "Push FB pics," which entails sending all Facebook pictures from jane65's hosted account having the alias "Facebook Jane" to all of jane65's associated devices. As shown, jane65 is also provided with access to these pictures from a web-based portal, as described further herein. Selectable elements 911 and 919 such as hyperlinks or menu options, provide a user with the ability to edit the settings of existing distribution policies. A selectable element 920 such as a hyperlink or menu option provides a user with the ability to add a new distribution policy and adjust its settings.

FIG. 9B illustrates an example of a graphical user interface 930 for defining a distribution policy. The interface 930 may be displayed, for example, in response to a user selecting one of the selectable elements of FIG. 9A, such as 911, 919 or 920 in order to create a new distribution policy or edit an existing distribution policy. As shown, the interface 930 includes a distribution policy name field 932 and description field 934 to permit a user to edit a name and a narrative description for the distribution policy. The interface 930 also includes fields 936, 938, 940, other types of menus 942, dynamic lookup fields, or similar to permit a user to build a set of criteria that define which set of data objects should be distributed under the policy. Although not shown, the interface 930 may include options for creating complex expressions of criteria, including expressions that utilize Boolean operators and set operators.

As one example, as shown, the interface 930 may permit a user to specify a source location, a file type, and a modification date in order to define the set of data objects that should be distributed under the policy. A source location may be defined by an alias for a hosted account, an alias or hostname for a computing device (including mobile devices), and/or a directory path within a hosted account or computing device. Of course, other types of criteria may be used to define the set of data objects that should be distributed, including, without limitation file size, access control information, data classification tags, content information (e.g., keywords), and modification or creation dates.

The interface 930 also includes input fields 944, 946, and other types of menus 948 that permit a user to select one or more destination locations to where the defined set of data objects should be distributed. The destination locations may include specific computing devices, a class of computing devices (e.g., all computing devices associated with a particular user, all computing devices having certain characteristics such as having more than a threshold capacity of disk space or a particular application installed), and/or a directory within a specific computing device or within a class of computing devices. By permitting a user to define a destination directory, a user can merge data from multiple sources into a specific folder on a destination device. In some examples, a user can omit a source directory path and destination directory path from the criteria, so that all data from a source device (e.g., a smartphone) is synchronized with all of the data at a destination device (e.g., a tablet).

Although not shown, a distribution policy may also specify whether a preview version or a copy of a version of an implicated data object should be automatically pushed by the distribution module to the destination location, even if it doesn't receive an explicit request for it from a destination computing device. The policy may also specify triggers for pushing unsolicited previews or copies. For example, a distribution policy may specify that a preview version or copy of an implicated data object should be pushed immediately when the preview or copy becomes available (or at the first opportunity thereafter) so that the destination device has a cached version available.

A synchronization policy field 950 permits a user to select or define whether and how data should be synchronized across the source and destination computing devices and may include pre-defined synchronization policies and/or a menu option to build a custom synchronization policy. One example of a synchronization policy is a one-way synchronization policy ("push only"), where only changes made to a data object at a source location are pushed or propagated to a destination location but changes made at a destination location are not propagated back to the source location. Another example is full two-way synchronization, where all changes made to a data object at any location (any source or destination location) are pushed or propagated to all other locations where a copy of the data object is located. A synchronization policy may further specify how frequently to distribute or receive changes to a data object (or other conditions for distributing or receiving data changes). A synchronization policy may also specify whether to lock access to a data object at locations where it is distributed if a copy of the object is being edited at another location. In this way, a synchronization policy may ensure that only one copy of a data object is unlocked for editing at any given time, so that only one computing device can edit the data object. Alternatively, a synchronization policy may specify methods for resolving concurrent editing of the same data object by more than one computing device. Although not shown, the interface 930 may permit a user to define other characteristics of a distribution policy, such as conditions precedent for collecting changes to a data object, receiving changes to a data object, opening a data object or preview, or editing a data object. Examples of these conditions include the type of network connectivity that can or cannot be used for data collection or distribution (e.g., a WiFi connection or a domestic cellular network), a specific "blacklist" of network access points that cannot be used for data collection or distribution, a specific "whitelist" of network access points that may be used for data collection or distribution, and operating conditions such as battery life that must be satisfied during data collection or distribution. The policy may also specify that certain data objects or preview cannot be opened on a computing device unless the computing device is within a certain IP address range or connected via a specific network. Other polices are of course possible, including combinations of those disclosed herein.

It should be noted that the information management system 150 permits a single user to define different distribution policies for their different computing devices, which gives the users more flexibility to customize their experience on each device. As just one example, a user may specify that their photos are synchronized to all their devices but their videos are only synchronized across devices that have sufficient data storage space to accommodate numerous videos. This is in contrast to some conventional techniques for data synchronization, which do not permit different synchronization policies for different devices.

Also, although not shown in FIGS. 9A and 9B, the information management system 150 permits administrators of the information management system 150 to define or modify distribution policies for other users, including policies that prohibit data distribution for certain data objects, to certain users/locations and/or under certain conditions. For example, an IMS administrator may create a system-wide distribution policy that specifies that photos or videos that originate from any employee's Facebook hosted account cannot be distributed to desktop computers or laptop computers owned by an organization. The IMS may disregard any distribution policies set by an individual user to the extent those individual rules are contrary to an administrator-defined policy.

Returning to the discussion of FIG. 8A, after receiving distribution policies for a user's data, the distribution module 805 may send these policies to any computing devices implicated by the policy, including computing devices that were identified as a source or destination location. In the example shown in FIG. 9A, the distribution module 805 may for example send distribution policies to all of jane65's computing devices, such as Janes Laptop and Janes Tablet. The distribution module may send distribution policies to the distribution client module 405 at the implicated computing devices to ensure the policies are properly implemented. For example, the distribution module may modify an information management policy for a source or destination computing device so that agents on the device continuously or intermittently push any changes to implicated data objects to the distribution module 490 for subsequent synchronization with the other computing devices implicated by the policy.

At block 810, the distribution module 490 receives a user's data objects and metadata, e.g., by receiving data objects and metadata from computing devices 205 or hosted services 122. The distribution module may receive entirely new data objects implicated by a distribution policy or new versions of data objects that were already subject to a distribution policy. For example, in accordance with an applicable distribution policy created and implemented at block 805 (or in accordance with other information management policies, such as backup policies), the distribution module may receive data from a user's computing device 205. Alternatively, or additionally, the distribution module 490 may receive hosted data that is implicated by a distribution policy by pulling the data from a hosted service in accordance with information management policies, as described previously at block 520.

At block 810, the distribution module 490 may receive a new version of a data object, e.g., either by receiving a copy of the changed data object itself or by receiving a copy of any blocks that have changed since the last version of the data object was received by the distribution module. Additionally, at block 810, instead of receiving a copy of a particular data object or a constituent block of a data object, the distribution module may receive a hash or other substantially unique identifier for the data object or a constituent block, if source-side deduplication techniques are implemented, e.g., as described in assignee's U.S. patent application Ser. No. 12/982,087, filed Dec. 30, 2010, entitled Systems and Methods for Retaining and Using Data Block Signatures in Data Protection Operations (which is hereby incorporated by reference herein in its entirety, and commonly-assigned U.S. patent application Ser. No. 12/751,850, which was introduced and incorporated by reference above. In conjunction with receiving data at block 810, the distribution module may also receive metadata associated with the data object, such as a file name, file or data object type, source directory, access control information, creation time, file or object size, and modification time.

At block 815, the distribution module 490 analyzes and indexes the data and metadata received at block 810. For example, for each data object received, the distribution module may perform content indexing and data classification analyses of the data object, as described further in the assignee's U.S. Pat. Nos. 7,822,749 and 7,882,077, both of which are hereby incorporated herein by reference. The distribution module may store the results of the analyses and other information related to the data object in an object log index 1000, such as that shown in FIG. 10. The object log index may include one row for every version of a data object that is subject to a distribution policy. As shown, the object log index 1000 may include an object ID column 1002, a version ID column 1004, a hash column 1006, a user ID column 1008, an object lookup column 1010, a source column 1012, an object name column 1013, an analysis data column 1014, a time stamp column 1016, and a preview column 1020. Together, the object ID column, which stores data object identifiers, and the version ID column, which stores version numbers or similar version identifiers, provide a unique key for the table (though other IDs may be used in alternative embodiments). The hash column 1006 includes a hash, checksum, digest or other substantially unique identifier of the content of a data object to aid in deduplication and object identification. The user ID column 1008 identifies a user who is associated with a data distribution policy that implicates the data object. The object lookup column 1010 provides a pointer or other reference to one or more stored copies of the version of the data object such as production or nonproduction copies of the version of the data object. The source column 1012 indicates where the version of the data object originated from, such as the hostname (or device alias) and directory from which the object originated, or a hosted service alias and hosted directory that produced the data object. The analysis data column 1014 points to or otherwise provides access to metadata, content indexing information, and data classification tags associated with the version of the data object. The timestamp column 1016 indicates when the version of the data object was received by the distribution module (or alternatively, the modification time of the version, as determined from its source). The preview column 1020 includes a pointer or other reference to one or more preview versions of the version of the data object. Each preview version may be a simplified or otherwise optimized version of the data object suitable for the user interface capabilities of a particular computing device or class of computing devices across which the data object is distributed. For example, a preview of a PowerPoint presentation suitable for a mobile device may be a limited functionality HTML or PDF version of the presentation. More discussion of appropriate methods for generating preview versions of data objects may be found in the commonly-assigned U.S. Provisional Patent Application No. 61/618,125 entitled "Smart Archiving and Data Previewing for Mobile Devices," filed Mar. 30, 2012, which is hereby incorporated by reference herein in its entirety.

Returning to the process 800 of FIG. 8A, at block 820, the distribution module 490 creates additional non-production copies of the received data objects and metadata, for example, in accordance with applicable information management policies. For example, an information management policy may mandate that each received version of a data object should be stored both as a backup copy in disk media and also in an archive format on tape for long-term storage. When creating additional non-production copies of the received data objects and metadata, the distribution module may update the object lookup column 1010 in the object log index 1000 to reflect the storage locations of these additional non-production copies.

At block 825, the distribution module 490 determines where to distribute copies of the received data objects, index information related to the received data objects, and/or preview versions of the received data objects. For example, the distribution module may analyze the distribution policies received at block 805 and any other applicable information management policies to determine that it should distribute a received data object, its related index information, and/or a preview version of the object to a particular destination location, such as a particular destination computing device. In some examples, the distribution module 490 records the result of its determinations in a distribution index 1100, such as that shown in FIG. 11, which includes a single row for each unique combination of a version of a data object and a destination location. As shown, the distribution index 1100 includes a user ID column 1102, an object ID column 1106, and a version ID column 1108, that together identify a row in the object log index 1000. The distribution index 1100 also includes a destination column 1104, which indicates a particular destination device (or web portal) that should provide user access to the version of the data object, index information for the object (such as metadata), or a related preview version. The distribution index 1100 also includes a destination directory column 1105 that indicates where in a destination directory tree structure the data object should be placed. For example, rows 1101 and 1103 indicate that Janes Laptop and Janes Tablet should both receive version 1 of the data object identified by object ID 123456 (i.e., the "Image1.jpg" object described by row 1030 in FIG. 10) and the user will be able to find the "Image1.jpg" file in the directory folder "Facebook Jane/pics/European Album." Row 1105 indicates that jane65 should also be able to access the Image1.jpg from a web-based portal, as described further herein.

The distribution index 1100 may also include one or more columns to track whether and when a data object, a related preview, or related index information about a data object has been distributed to a particular destination. For example, an index sent column 1110 indicates when a particular destination device (or portal) receives index information about the version of the data object, as described further herein. As another example, a preview sent timestamp column 1112 indicates when a particular destination device or portal receives a preview version of a data object. As yet another example, a copy sent column 1114 indicates when a particular destination device or portal receives a copy of a particular version of the data object. A copy locked column 1116 indicates whether a particular computing device or portal is actively editing an object and thus, under the applicable synchronization policy, other computing devices or portals should be blocked from simultaneously editing the object.

Of course, different types of index data structures could provide similar functionalities to those described in connection with the object log index 1000 and distribution index 1100. Additionally, in accordance with applicable storage policies, the distribution module may intermittently or on a prescribed schedule prune the indices 1000 and 1100 to remove all references to versions of data objects that meet predefined criteria (e.g., older versions that haven't been accessed during a prescribed period). Additionally, the distribution module may delete stored non-production copies and/or preview versions of these pruned data objects.

Returning to FIG. 8A, after the distribution module 490 determines where to distribute data objects, index information, and/or preview versions of the received data objects, the process 800 ends.

Figure 8B:
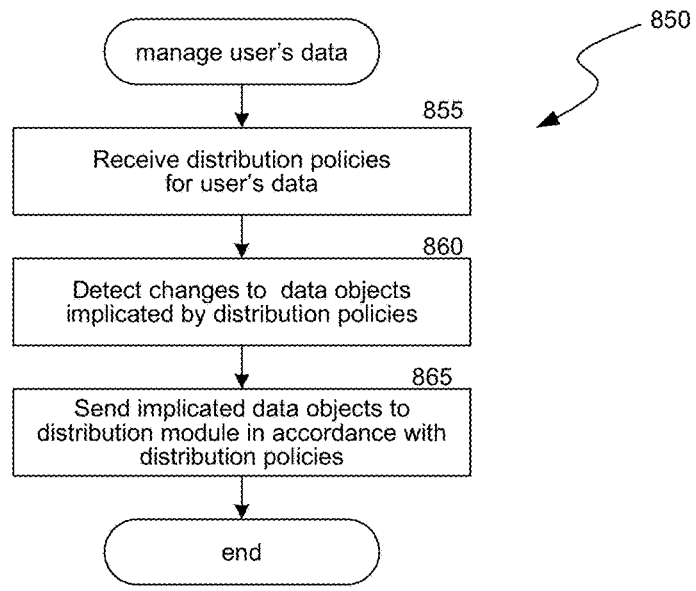
FIG. 8B is a flow chart that illustrates a process for managing a user's data that may be performed at a computing device.

A distribution client module 405 may perform actions that are complementary to the process 800 performed by a distribution module 940. FIG. 8B is a flow chart that illustrates a process 850 for managing a user's data that may be performed at a computing device, e.g., by a distribution client module 405. The process 850 begins at block 855, where the distribution client module 405 receives information management policies for a user's data, including distribution policies. For example, as described previously at block 805, the distribution client module 405 may receive user-defined distribution policies from the distribution module 490. Alternatively, the distribution client module 405 may directly receive distribution policies from a user (for example, if the distribution client module provides interfaces similar to interfaces 900 and 930) and may push these received distribution policies to the distribution module 490.

At block 860, the distribution client module 405 detects changes to a user's data objects that are implicated by a distribution policy, i.e., objects that match the criteria specified by a distribution policy. As a first example, the distribution module may determine that a user has created a new file implicated by a distribution policy. As a second example, the distribution module may determine that a user has opened and edited a file on a source device, and the file is implicated by a distribution policy that specifies one-way or two-way synchronization across devices. As a third example, the distribution client module may determine that a user has opened and edited a file at a source or destination location, and the file is implicated by a distribution policy that specifies two-way synchronization across devices.

At block 865, the distribution client module 405 sends a copy of the implicated data objects to the distribution module 490 in accordance with the distribution policies (i.e., resulting in block 810 of process 800). The timing of block 865 may be mandated by settings of the distribution policy and may be opportunistic (e.g., when a low-cost or high-speed network connection is available to the distribution client module). For example, the distribution policy may specify particular conditions for sending the data objects such as requiring that the device sending the copy is on a corporate network or corporate VPN, has WiFi or another type of network access, has a minimum level of battery power left, etc. After block 865, the process 800 ends. The data objects may be sent using continuous data replication techniques such those techniques described in assignee's U.S. patent application Ser. No. 12/167,933, entitled "Continuous Data Protection Over Intermittent Connections, Such as Continuous Data Backup For Laptops or Wireless Devices," filed Jul. 3, 2008, now U.S. Patent Publication Number 2010-0005259 and/or source-side deduplication techniques such those techniques described in commonly-assigned U.S. patent application Ser. No. 12/982,087 (introduced earlier above) and assignee's U.S. patent application Ser. No. 12/751,850 (introduced and incorporated by reference earlier above), all of which are hereby incorporated by reference herein in their entirety.

Unified Views of a User's Data

As introduced above, the information management system 150 may distribute a user's data and/or indices of a user's data so that the user can obtain a unified view of all of her data that has been created and modified across different hosted services and different computing devices. The information management system permits the user to obtain this unified view and access her data on different computing devices or via a web portal.

Figure 13:
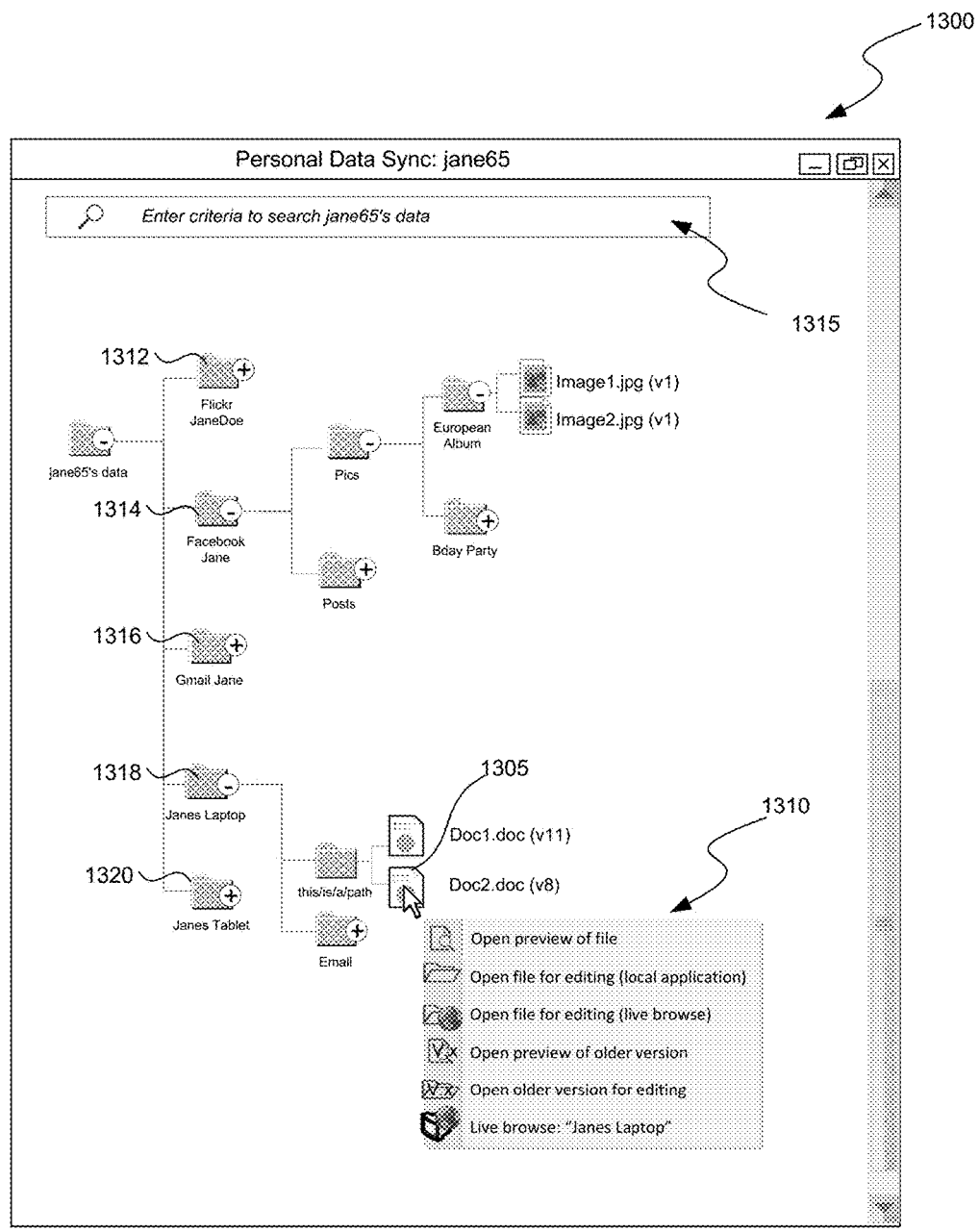
FIG. 13 illustrates an example of a graphical user interface for providing a user with unified access to all of her hosted data and data from other computing devices.

FIG. 13 illustrates one example of a graphical user interface 1300 for providing a user with unified access to their data, including data that has originated from multiple computing devices and/or multiple hosted services. As shown, the interface 1300 may depict a user's data as a navigable directory or folder tree having different branches and data objects (represented by icons) within those branches. Each main branch in the directory tree may represent a different hosted service or computing device associated with the user via a distribution policy. For example, jane65's data is represented as a directory tree structure, where her "Flickr JaneDoe" hosted data falls under the main branch represented by the icon 1312, her "Facebook Jane" hosted data falls under the main branch represented by the icon 1314, her "Gmail Jane" hosted data falls under the main branch represented by the icon 1316, the data originating from her laptop with alias "Janes Laptop" falls under the main branch represented by the icon 1318, and the data originating from her tablet with alias "Janes Tablet" falls under the branch represented by the icon 1320. Each branch in the tree may have data objects and/or subsidiary folders. The subsidiary folders used to house a particular data object may reflect the directory path of the data object on a source computing device or hosted service that created or modified the data object. For example, as shown, "this/is/a/path" is the directory path on Janes Laptop where the documents Doc1.doc and Doc2.doc originated from. The folder used to house a particular data object may be specified by a distribution policy. For example, a distribution policy that implements two-way synchronization may specify that data objects that originated in a first directory path (e.g., "this/is/a/path") on a first source computing device should also be presented in a second directory path (e.g., "a/different/location") of a second destination device. Alternatively, or additionally, the subsidiary folders used to contain a particular data object may reflect metadata or other characteristics of the data object. For example, the two files "Image1.jpg" and "Image2.jpg" are shown under the "Facebook Jane/Pics" branch in accordance with a distribution policy but are also shown under the subsidiary "European Album" folder to indicate the name of a Facebook album from which they originated.

The interface 1300 may also provide the user with multiple ways to access their data objects. For example, if a user selects an icon associated with a data object (e.g., icon 1305), the user may be presented with a menu 1310 of options, such as the options of (1) opening a read-only preview version (e.g., a PDF or HTML version) of the newest version of the data object using a limited-feature viewer application (e.g., a pdf viewer or a browser), (2) opening a full version (e.g., a .doc version) of the newest version of the data object using a locally-installed, full-featured application associated with the file type of the data object (e.g., Microsoft Word), (3) opening the data object for viewing or editing by a full-featured application that is being run in a "live browse" mode using the processing capabilities of another, remote computing device (e.g., Janes Laptop), as described further herein, (4) opening a preview of an older version of the data object using a viewer, (5) opening a copy of an older version with a locally-installed, full-featured application.

Additionally, the menu may include an option to perform a "live browse" of the local files of another computing device (e.g., of the device with alias "Janes Laptop"), as described further herein. For example, if a user doesn't see a file they wanted under the "Janes Laptop" branch because it wasn't subject to a distribution policy, they may use the "live browse" option to try and locate it on the other device. Alternatively, or additionally, in some examples when a user double-clicks a particular data object icon 1305 (or otherwise indicates they wish to "open" the data object), the interface may respond by taking one of these actions by default. The default action taken may be dictated by the capabilities of the computing device presenting the interface 1300, such as its installed applications, processing power, and memory. For example, on a mobile device, the default action may be opening a preview version using a limited-feature viewer application.

In addition to providing a navigable directory structure, the interface 1300 may provide search menus or fields 1315 to permit the user to enter search criteria and receive a list of search results (or a filtered directory structure) that includes the data objects that match the criteria. For example, if a user enters criteria into the search field 1315, the client distribution module may search received content indexing information, data classification tags, and/or metadata to find and present matching data objects. In this way, the user may be able to search across the content, tags, and metadata of data objects that originated from numerous hosted services and/or numerous computing devices.

Also, the interface 1300 may provide "drag-and-drop" features. For example, the interface may permit a user to indicate that they want to receive a local copy or preview version of an object, simply by dragging an icon into a local directory folder. As another example, the interface may permit a user to indicate that they want to push a copy or preview version of an object to another computing device (thereby effectively creating a new distribution policy), simply by dragging an icon for a data object into the displayed navigable folder structure. In other words, the user can use the drag-and-drop feature to create a distribution policy to indicate data from one folder or device is to be copied to another location, without having to determine and enter path names or other information.

The interface 1300 shown is intended to be illustrative, not exhaustive. The user may obtain a unified view of their data, such as a view of interface 1300, in numerous ways. As one example, a user may provide the user's IMS authentication credentials (e.g., IMS username and password or other IMS authentication information) to a dedicated data navigation application, such as a downloaded mobile application that comprises a distribution client module 804. Or the application may obtain credentials from an operating system or directory or security service, such as an Active Directory service. As another example, a user may provide the user's IMS authentication credentials (e.g., IMS username and password or other IMS authentication information) to a web portal associated with the IMS in order to view and access her data through a personalized web interface similar to interface 1300. As another example, a native application installed on a user's computing device may provide a unified view of the her data. Examples of native applications that may be used include Windows Explorer or similar file system navigators (including NFS/CIFS clients) provided by an operating system and email clients such as Outlook (or IMAP clients).

In such examples, a distribution client module 405 may be implemented as a plug-in to the native application so that data objects originating from hosted services or other computing devices are presented to the user within the native application's interface in a manner similar to other locally-stored files or data objects, such as locally-stored files and locally-stored emails. For example, if a user has created a distribution policy that implements cross-device synchronization, synchronized data objects might simply appear within Windows Explorer or a similar application at a directory location (e.g., /a/different/path) on the destination device specified by the distribution policy. As another example, a user may have a folder on their desktop called "Remote Data," that provides access to an interface similar to 1300. As yet another example, Outlook may request and cache indexing information, previews and/or copies of synchronized data so that it can provide an interface such as that shown in FIG. 13, even when it does not have network connectivity.

Figure 12:
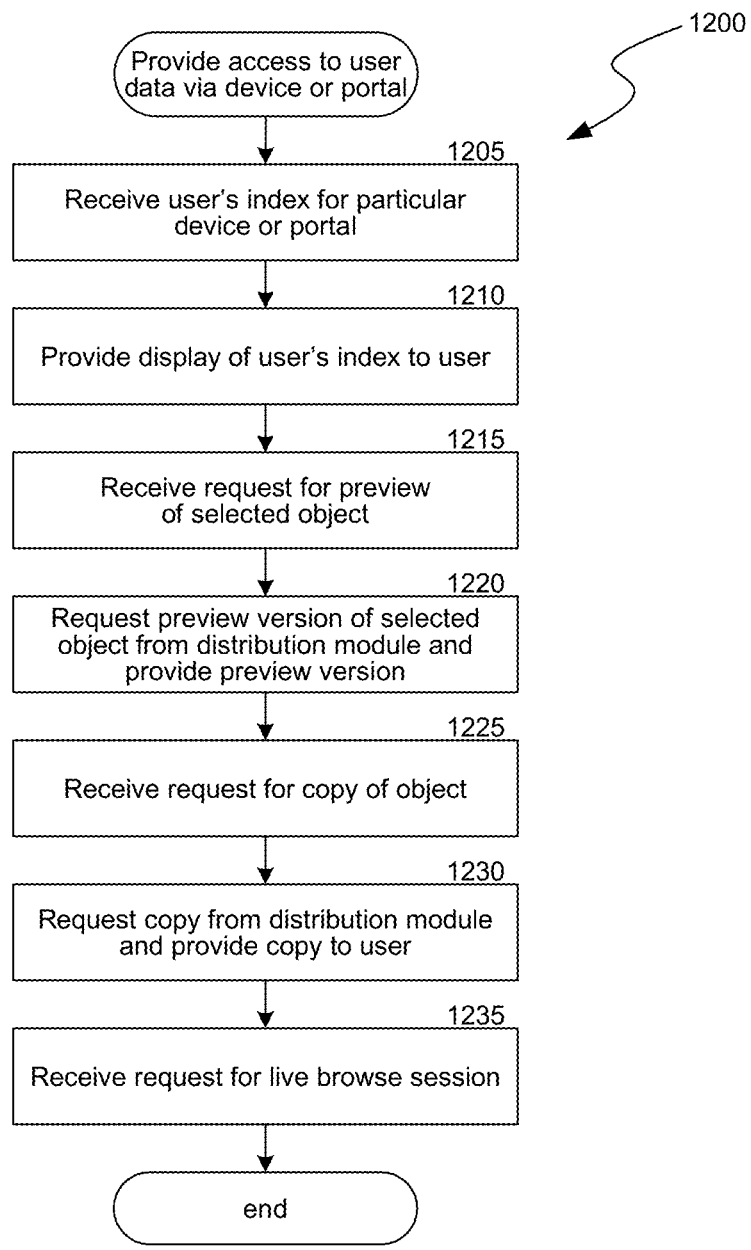
FIG. 12 is a flow chart that illustrates a process for providing a user with unified access to all of her hosted data and data from other computing devices.

FIG. 12 is a flow chart that illustrates a process 1200 for providing an IMS user working at a particular computing device with unified access to all of her hosted data and data from other computing devices, including synchronized data. The process may be performed at the computing device by an installed distribution client module 405, acting alone, or in concert with another application (e.g. as a plug-in to a native application such as Windows Explorer or Microsoft Outlook). Although the process 1200 is described as being performed to provide an IMS user with unified access to all of the user's hosted data and data from various computing devices, the process 1200 could also be utilized to permit some IMS users, such as compliance administrators, to obtain a unified view of data that was generated by other IMS users, e.g., in order to respond to discovery requests or for other legal compliance reasons.

Prior to the process 1200, the installed distribution client module may receive or obtain IMS credentials or other information identifying the IMS user or users whose data is to be presented as noted herein. Steps in process 1200 may be performed opportunistically, e.g., when a low-cost or high-speed network connection is available to the distribution client module on the computing device.

The process 1200 begins at block 1205, where the distribution client module 405 requests and receives index information related to the user's data, such as information from the object log index 1000 and distribution index 1100 that is specific to the user and the device or portal from which the user is accessing the data. Typically the request is made to and fulfilled by the distribution module 490. To illustrate, the distribution client module may request index information related to data objects that have been slated for distribution to the particular computing device and are associated with the user, e.g., as indicated by the destination column 1104 and the user ID column 1102 of the distribution log 1100. The distribution client module will typically request and receive sufficient information to permit the distribution client module to display an organized graphical depiction of the user's data, such as that shown in FIG. 13, and to perform searching of data objects' content index information, data classification tags, and metadata. For example, the distribution client module may request, for each new version of a data object, a destination directory (e.g., from 1105), an object name (1013), an object ID (1002), version ID (1004), and metadata and analysis data (1014) such as file type/extension, access control information, and file size. At block 1205, the distribution client module 405 may request only new index information and combine the new information with locally cached index information.

Next, at block 1210, the distribution client module 405 provides a navigable graphical display of the user's index information to the user. For example, the distribution client module 405 may interpret the received index information (and/or locally cached index information) in order to produce a graphical representation similar to interface 1300. Alternatively, the distribution client module 405 may interpret the received index information in order to instruct another application (e.g., Windows Explorer or Outlook) regarding how to provide a similar graphical representation.

At block 1215, the distribution client module 405 receives a request to provide a preview of a selected version of a selected object (e.g., via a menu 1310 or a double-click). In response, at block 1220, the distribution client module 405 requests a preview version of the selected data object from the distribution module 490 (e.g., by sending an object ID and version ID). When the distribution client module receives the requested preview version, it presents the preview version to the user using a limited-feature viewer application, such as a PDF viewer or web browser.

At block 1225, the distribution client module 405 receives a request for a copy of a selected version of a selected object (e.g., via a menu 1310 or a double-click). In response, at block 1230, the distribution client module 405 requests a copy of the selected version of the selected data object from the distribution module 490 (e.g., by providing an associated object ID and version ID). Once the copy is received, the distribution client module launches an application capable of opening the data object, typically a full-featured application associated with the file type of the data object. If a user edits a copy of a selected data object, the distribution client module may push a copy of the edited version back to its source computing device (via the distribution module), so that the source computing device has the latest version of the data object.

At block 1235, the distribution client module 405 receives a request for a live browse session. These requests are described in further detail herein with respect to FIGS. 14 and 15. The process 1200 then ends.

Although process 1200 has been described as being performed at a particular computing device, a similar process 1200 may be performed by a web server associated with the IMS that is configured to provide IMS users with a web portal to access their data. In such examples, the steps that were described above as being performed by a distribution client module may instead be performed by a web server.

Figure 14:
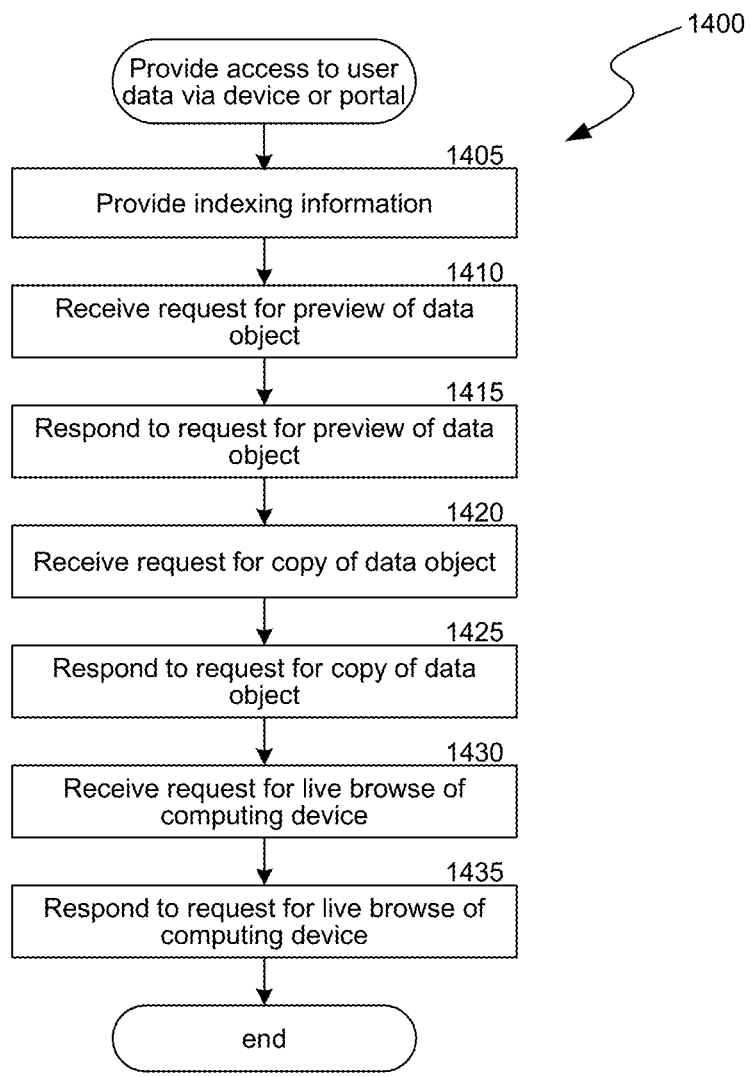
FIG. 14 is a flow chart that illustrates a process for providing a user with access to her data that may be performed at a distribution module.

A distribution module 490 may perform actions that are complementary to the process 1200 performed by a distribution client module 490. FIG. 14 is a flow chart that illustrates a complementary process 1400 for providing a user with access to her data that may be performed at a distribution module. The process 1400 begins at block 1405, where the distribution module 405 provides indexing information related to a particular user and computing device to the distribution client module 490. To illustrate, the distribution module may provide index information related to data objects that have been slated for distribution to the particular computing device and are associated with the user, e.g., as indicated by the destination column 1104 and the user ID column 1102 of the distribution log 1100. The distribution module will typically provide sufficient information to permit the distribution client module to display an organized graphical depiction of the user's data, such as that shown in FIG. 13, and to perform searching of data objects' content index information, data classification tags, and metadata. For example, the distribution module may send, for each new version of a data object, a destination directory (e.g., from 1105), an object name (1013), an object ID (1002), version ID (1004), and metadata and analysis data (1014) such as file type/extension, access control information, and file size. At block 1410, the distribution module may provide only new index information. The distribution module may use information such as that shown in column 1110 to identify only the new versions of objects where the indexing information has not already been sent.

At block 1410, the distribution module 490 receives a request to send a preview version of a data object to a distribution client module 405. The request may indicate an object identifier and/or version identifier associated with a single desired data object. Alternatively, the request may ask for preview versions of numerous data objects that match a provided set of criteria. For example, the request may ask for any new preview versions generated in the last 30 days, so that those recent previews can be cached by the client distribution module 405. In response to the received request, at block 1415, for each indicated version of a data object, the distribution module selects a preview version by using a received data object identifier and version identifier (or the received criteria) to look up an associated preview version from the preview column 1020 of the object log index 1000. When selecting the preview version, the distribution module may determine the capabilities of the device or portal that will be used to display the preview to the user. The distribution module may then select a preview version based on the determined capabilities. For example, the distribution module may determine the hard disk capacity, memory capacity, video or sound card specifications, network connection type or bandwidth, processing power, and installed applications of the computing device and select a preview version that is best suited to those characteristics. More information about selecting preview versions suitable for a particular computing device can be found in the commonly-assigned U.S. Provisional Patent Application No. 61/618,125 entitled "Smart Archiving and Data Previewing for Mobile Devices," filed Mar. 30, 2012, which is hereby incorporated by reference herein in its entirety. If there is no existing preview version available from the object log index 1000 that is suitable for the capabilities of the computing device, the distribution module may generate a suitable preview version. The distribution module then sends the selected preview version(s) to the distribution client module, which may be performed using source-side deduplication techniques.

At block 1420, the distribution module 490 receives a request to send a copy of a selected version of a selected data object to a distribution client module 405. The request may indicate a data object identifier and/or version identifier associated with the desired data object (or may specify a set of criteria that identifies one or more versions of one or more data objects). In response to the received request, at block 1425, the distribution module locates a copy of the requested version of a data object by using a received data object identifier and version identifier (or other criteria) to look up an associated stored copy from the object lookup column 1010 of the object log index 1000. The distribution module then sends the located copy to the distribution client module, which may be performed using source-side deduplication techniques. When an applicable synchronization policy specifies locking, as described previously, before performing block 1420, the distribution module may verify that the object has not already been locked and after performing block 1420, the distribution module may add a "lock" on the data object to prevent other computing devices from simultaneously editing the data object, e.g., by adding a timestamp to column 1116.

At block 1430, the distribution module 490 receives a request from a requesting distribution client module 405 at a requesting computing device to facilitate a "live browse" session between the requesting distribution client module and a second, target computing device. There are two variants of a live browse session. A first variant of a live browse session presents a user at the requesting computing device with a browseable and searchable view of data objects on the target computing device, even if those data objects have not yet been pushed to the distribution module 490. In a second variant, the requesting distribution client module requests to open a data object in a "live browse" mode. The second variant permits the requesting distribution client module to utilize computing resources of the target computing device (e.g., processing power, installed applications, memory, hard disk) in order to view or manipulate files and other data objects.

At block 1435, the distribution module 490 responds to the request for a live browse session. When a request for the first variant of live browsing is received (i.e., a request to browse the files of a target computing device), the distribution module may first determine if the target computing device is online, i.e., has network connectivity to the distribution module. If the target computing device is not online, the distribution module may access backup copies of the data from the target computing device and/or indexing information that were created as part of a backup operation in order to create an index similar to that shown in the object log index 1000, which reflects the data contents and organization of the target computing device. Otherwise, if the target computing device is online, the distribution module may query a distribution client module 405 at the target computing device and ask it to provide an updated index of all of the file folders and data objects on the target computing device (or a subset of its folders and data objects). For example, the distribution module may request indexing information for each data object similar to the indexing information shown in the object log index 1000. The distribution module then provides the indexing information obtained from either the backup operations or from the target computer itself to the requesting distribution client module. The requesting distribution client module uses the indexing information to produce an interface with a graphical, navigable and searchable file folder structure of the folders and data objects on the target computing device, such as the interface shown in FIG. 13. From the interface, a user may select a displayed object and drag it to a local directory (e.g., her desktop) so that a copy is created locally on the requesting computing device.

The requests and responses at block 1435 may be iterative, so that the distribution module first obtains and provides only coarse indexing information (e.g., only the data objects and folders that appear in top-level file folders of the target device) and then later obtains and provides additional indexing information, e.g., in response to a user navigating to a specific folder in a displayed navigable file folder structure. For example, the distribution module may, upon such user navigation, obtain and provide more granular indexing information for specific folders on the target computing device. If a user indicates that she wishes to open a preview version or copy of the data object shown in the navigable folder structure (e.g., as described previously with respect to FIG. 13), the distribution module may obtain a preview version or copy from the target computer (and if necessary, generate a suitable preview version) and provide the preview version or copy to the requesting distribution client module. If a user edits a copy of a selected data object on the requesting computing device, the requesting distribution client module may push the edited version back to the target computing device (via the distribution module), so that the target computing device has the latest version of the data object.

In addition to providing index information related to the data objects available on a target computing device, the distribution module may also determine and provide information regarding the applications that are installed on the target computing device and are capable of being run in a "live browse" mode. In this way, the user can initiate applications on the target computing device from a requesting device such as a limited-feature mobile device.

The previous discussion described the distribution module as playing an intermediary role by collecting and distributing indexing information, preview versions, and copies of data objects. However, in some examples, instead the target distribution client module may communicate directly with the requesting distribution client module to exchange this information directly. Also, the requesting distribution client module may generate preview versions, as needed.

When a request for the second variant of live browsing is received, in response, at block 1435, the distribution module 490 identifies the target computing device and establishes a secure connection between a requesting distribution client module and a target distribution client module at the target computing device. Once the connection is established, the target distribution client module may initiate applications installed at the target computing device and provide an optimized view of the application to the requesting distribution client module. This second feature of a live browse session is described in greater detail herein, e.g., with respect to FIGS. 15A and 15B. After block 1435, the process 1400 ends.

The distribution module 490 and client distribution module 405 may perform variants of the processes 1400 and 1200 respectively. As one example, instead of providing a preview of a data object only in response to an explicit request for the preview, the distribution module 490 may instead provide a preview of a data object when a new version of the data object is received and indexed, in conjunction with indexing information at block 1405, and/or upon a prescribed schedule. As another example, instead of providing a copy of a data object in response to an explicit request for the copy, the distribution module may instead provide a copy of the data object when a new version of the data object is received and indexed and/or upon a prescribed schedule. In these variants, the methods may keep data objects that are being edited at different computing devices synchronized across those different computing devices. When all of the synchronized computing devices have network access, cross-device synchronization may occur nearly in real-time. In another variant, instead of providing a preview of a data object or a copy of a data object only in response to an explicit request for a preview or copy, the distribution module may proactively push a subset of the previews and data objects (e.g., in conjunction with indexing information) and the distribution client module may cache these so it can respond to user requests even when it has no network connectivity. For example, the distribution module may proactively push previews or copies of any objects that have been edited in the last 30 days.

Live Browsing

The second variant of a live browse session permits a user of a mobile device or other limited-feature device to execute full-featured applications installed on a remote computing device (e.g., a desktop or laptop device) and to interact with the full-featured application via the input-output hardware of the limited-feature device. As described above, when a user of a requesting computing device indicates that they want to open a data object in a "live browse" mode, a connection is established between a distribution client module 405 at the requesting computer (the "requesting distribution client module") and a distribution client module 405 at the target computing device (the "target distribution client module." The target distribution client module identifies a copy of the data object and if necessary, requests a copy of the data object, e.g., from a distribution module 490. The target distribution client module launches an instance of a full-featured native application using the processor and memory of the target computing device in order to open the data object in the native application.

Figure 15A:
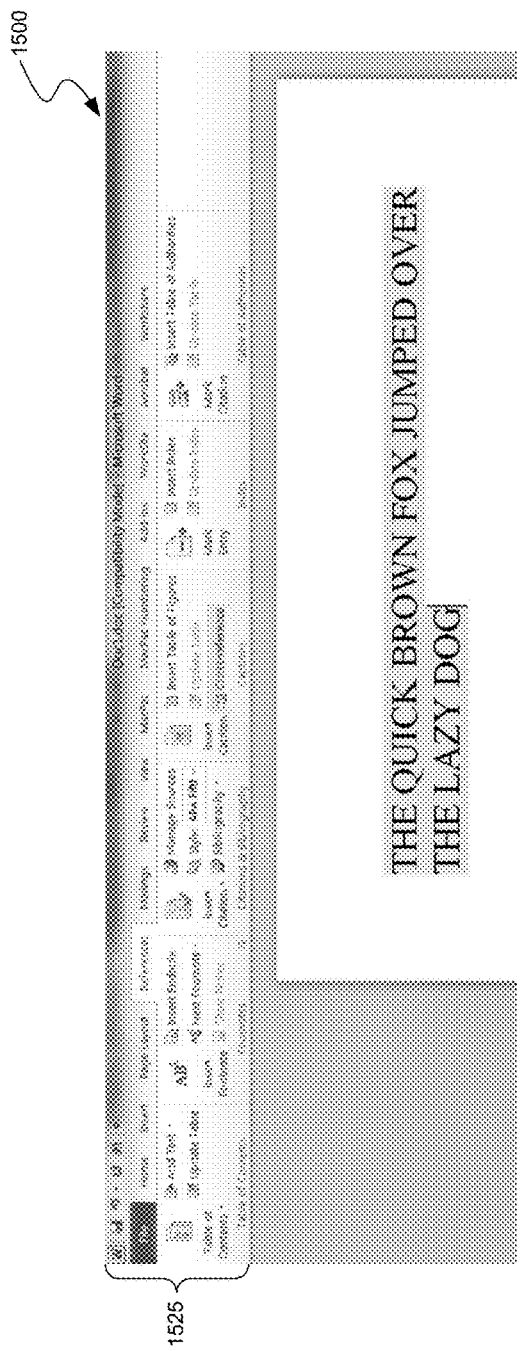
FIGS. 15A and 15B show illustrative examples of a native interface to an application and a "live browse" interface.
Figure 15B:
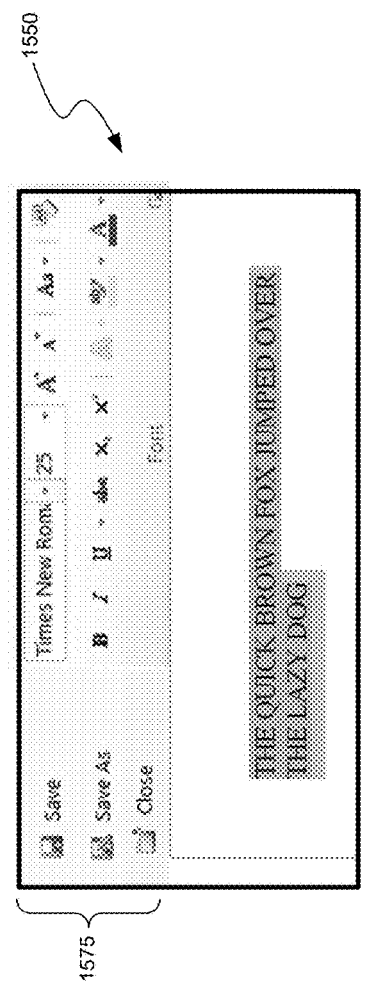

As shown in FIG. 15A, when a full-featured native application (e.g., Microsoft Word) is used to edit a file or data object, such as a Word document, the computing device where the native application is installed would normally produce a native graphical interface 1500. The native interface 1500 includes full-featured menus 1525 that permit the user to initiate numerous and complex menu commands. In contrast, in live browse mode, when a target distribution client module launches a full-featured native application, the target distribution client module interprets the output from the full-featured application in order to produce a simplified graphical interface 1550 for the application, as shown in FIG. 15B. For example, the target distribution client module may generate an HTML interface that provides only a highly limited set of menu options 1575. The target distribution client module then sends a representation of the simplified graphical interface 1575 to the requesting distribution client module, which displays the interface to the user at the requesting computing device (e.g., in a browser). These two steps may be repeated as the target distribution client module receives updated output from the full-featured application. In concert with these actions, the target distribution client module may send any user input it receives from the simplified graphical interface 1575 back to the target distribution client module. The target distribution client module interprets or translates any received user input and conveys the input to the native full-featured application. In this way, a user may be able to utilize, in a limited way, full-featured applications that are installed at a remote computing device.

Other Features

In some examples, the functionality of the information management system may be provided to an organization on a subscription, or software-as-a-service or platform-as-a-service basis. In such examples, the operator of the information management system may charge an organization on a per-user basis and/or on the basis of other metrics of usage.

CONCLUSION

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other computing devices suitable for the purposes described herein. Modules described herein may be executed by a general-purpose computer, e.g., a server computer, wireless device, or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Furthermore, aspects of the invention can be embodied in a special purpose computer or data processor that is specifically programmed, configured, or constructed to perform one or more of the computer-executable instructions explained in detail herein.

Software and other modules may be accessible via local memory, a network, a browser, or other application in an ASP context, or via another means suitable for the purposes described herein. Examples of the technology can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein.

Examples of the technology may be stored or distributed on computer-readable media, including magnetically or optically readable computer disks, hard-wired or preprogrammed chips (e.g., EEPROM semiconductor chips), nanotechnology memory, or other data storage media. Indeed, computer-implemented instructions, data structures, screen displays, and other data under aspects of the invention may be distributed over the Internet or over other networks (including wireless networks), or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the systems described herein. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain examples are presented below in certain forms, the applicant contemplates the various aspects of the invention in any number of claim forms. Accordingly, the applicant reserves the right to add additional claims after filing the application to pursue such additional claim forms for other aspects of the invention.

We claim:

1. At least one computer readable medium, excluding transitory signals, and carrying instructions, which when executed by at least one data processor, performs a method for providing access to data, the method comprising:
    associating multiple computing devices with a user of an information management system,
        wherein at least one of the multiple computing devices is a mobile device having wireless communication capabilities;
    assigning information management policies to data from the multiple computing devices;
    receiving multiple data objects from the multiple computing devices;
    analyzing each data object to generate an identifier for each data object;
    generating at least one preview version of each collected data object,
        wherein the preview version is based at least partially on the capabilities of the computing device that will display the preview version to the user; and
    providing the at least one preview version of a collected data object and the identifier of the collected data object to at least one of the multiple computing devices associated with the user.

2. The computer readable medium of claim 1, wherein the information management policy is associated with the information management system, and wherein the information management policy includes a distribution policy that specifies a set of data objects to distribute from one of the multiple computing devices to another of the multiple computing devices, or specifies a set of conditions that must be met before collecting data objects from one of the multiple computers.

3. The computer readable medium of claim 1, wherein the information management policy includes a distribution policy that specifies how to synchronize data objects from one of the multiple computing devices to another of the multiple computing devices, and wherein the at least one preview version of a collected data object is provided to the at least one of the multiple computing devices associated with the user in accordance with the distribution policy.

4. The computer readable medium of claim 1, wherein the information management policy includes a distribution policy that specifies a source directory on one of the multiple computing devices that is synchronized to another directory on a different one of the multiple computing devices.

5. The computer readable medium of claim 1, further comprising responding to a request for a live browse session from the user by enabling the user to view a user interface of one of the multiple computing devices from another of the multiple computing devices.

6. The computer readable medium of claim 1, further comprising:
    determining a storage capacity of the mobile device prior to generating the preview version of each collected data object; and
    formatting the preview versions based on the storage capacity.

7. The computer readable medium of claim 1, further comprising:
    determining a video card specification of the one of the multiple computing devices prior to generating the preview version of each collected data object; and
    formatting the preview versions based on the video card specification of the computing device.

8. A method for providing a user with a synchronized view of a user's data within a computing system, the method comprising:
    receiving a data object at a computing device associated with an information management system;
    determining that the data object is subject to a distribution policy;
    analyzing the data object to generate an identifier for the data object;
    generating a preview of the data object,
        wherein the preview is based at least partially on the capabilities of the computing device that will display the preview to the user; and
    distributing the preview of the data object, the identifier of the data object, and a copy of the data object to other computing devices associated with the user and associated with the information management system, in accordance with the distribution policy.

9. The method of claim 8, further comprising:
    determining characteristics of the other computing devices,
        wherein generating a preview of the data object generates the previews based on the characteristics of the other computing devices.

10. The method of claim 8, wherein the distribution policy specifies a set of data objects to distribute from the computing device to the other computing devices.

11. The method of claim 8, wherein the distribution policy specifies how to synchronize data objects from the computing device to the other computing devices.

12. A system configured to collect, manage and distribute data and metadata from multiple sources, including data and metadata for a user, wherein the data and metadata is received over a network from at least one computer and one mobile device for the user, and from one or more hosted services to which the user has an account, the system comprising:
    at least one hardware processor;
    at least one network connection, coupled to the at least one processor, and receiving data objects and metadata received from—
        the at least one computer for the user,
        the at least one mobile device for the user, and
        the one or more hosted services to which the user has an account;
    at least one data storage device, coupled to the at least one processor, and storing: instructions, the metadata, the data objects, and multiple information management policies;
        wherein the information management policies are provided, at least in part, by an employer of the user or by an administrator; and wherein the instructions, when executed by the at least one processor—
associate the at least one computer and the at least one mobile device with the user;
associate the one or more hosted services with the user;
assign different information management policies to the data objects received from the at least one computer and at least one mobile device for the user, and the one or more hosted services;
generate indexing information for each of the data objects; and
provide for display the generated indexing information for the data objects,
wherein the user may view the indexing information via the at least one computer and the at least one mobile device for the user.

13. The system of claim 12, wherein the wherein the instructions, when executed by the at least one processor, provides to the user a unified view of the data objects across the at least one computer and the at least one mobile device for the user, and keeps the data objects synchronized across the at least one computer and the at least one mobile device for the user.

14. The system of claim 12, wherein the information management policies include a user-defined information distribution policy, wherein the instructions, when executed by the at least one processor, distributes and synchronizes the data objects among the at least one computer and the at least one mobile device for the user based on the distribution policy.

15. The system of claim 12, wherein the information management policies and the instructions, when executed by the at least one processor, provides a closed corporate collaboration environment wherein the data objects are exchanged and synchronized across the at least one computer and the at least one mobile device for the user, using resources of a private information management system, to avoid the data objects being exposed to third parties by being stored or controlled by third party data storage sites.

16. The system of claim 12, wherein the information management policies and the instructions, when executed by the at least one processor, permit an organization to comply with data retention regulations by receiving and managing the user's data objects, including the user's data originating from the at least one mobile device, and permits the organization to respond to unexpected data losses, including the loss of the at least one mobile device or a service outage by the one or more hosted services, because the system actively manages copies of the data objects from the at least one mobile device and the one or more hosted services.

* * * * *